US011070043B1

(12) United States Patent
Marbach et al.

(10) Patent No.: US 11,070,043 B1
(45) Date of Patent: Jul. 20, 2021

(54) CABLE SPLICE SLEEVE ASSEMBLIES

(71) Applicant: POWER FEED THRU SYSTEMS AND CONNECTORS LLC, Deer Park, TX (US)

(72) Inventors: Brandon Marbach, Houston, TX (US); Roy Kinkaid, Houston, TX (US)

(73) Assignee: POWER FEED THRU SYSTEMS AND CONNECTORS LLC, Deer Par, TX (US)

( * ) Notice: Subject to any disclaimer, the term of this patent is extended or adjusted under 35 U.S.C. 154(b) by 0 days.

(21) Appl. No.: 16/520,221

(22) Filed: Jul. 23, 2019

(51) Int. Cl.
H02G 15/18 (2006.01)
H01B 17/66 (2006.01)
H01B 17/58 (2006.01)

(52) U.S. Cl.
CPC ............ *H02G 15/18* (2013.01); *H01B 17/58* (2013.01); *H01B 17/66* (2013.01)

(58) Field of Classification Search
CPC ...... H02G 15/02; H02G 15/04; H02G 15/043; H02G 15/046; H02G 15/08; H02G 15/18; H02G 15/22; H02G 15/23; H01B 17/58; H01B 17/66; H01R 4/22
USPC .............................. 174/84 R, 88 R, 92, 94 R
See application file for complete search history.

(56) References Cited

U.S. PATENT DOCUMENTS

| | | | | | |
|---|---|---|---|---|---|
| 2,182,896 | A | * | 12/1939 | Hixon | H02G 15/115 439/864 |
| 2,967,899 | A | * | 1/1961 | Priaroggia | H02G 15/24 174/22 R |
| 3,055,972 | A | * | 9/1962 | Peterson | H02G 3/0658 174/151 |
| 3,812,456 | A | * | 5/1974 | Lane | G10K 11/04 367/141 |
| 3,963,297 | A | * | 6/1976 | Panek | H01R 13/523 439/204 |
| 4,225,746 | A | * | 9/1980 | Ball | H02G 15/24 174/22 R |
| 4,363,168 | A | * | 12/1982 | Bryer | H01R 13/523 166/341 |
| 4,530,075 | A | * | 7/1985 | Pearson | H02G 15/14 367/20 |
| 5,645,438 | A | * | 7/1997 | Cairns | G02B 6/3816 439/139 |
| 2018/0109093 | A1 | * | 4/2018 | Gibson | H02G 3/0675 |
| 2019/0157796 | A1 | * | 5/2019 | Janle | H01R 13/523 |

* cited by examiner

Primary Examiner — William H. Mayo, III
(74) Attorney, Agent, or Firm — David G. Henry, Sr.

(57) ABSTRACT

Cable splice sleeve assemblies and methods of housing cables. The assemblies may include reversibly engageable segments configured with interlocking ends. When engaged, the segments form a seal that insulates cable terminals disposed within the sleeve assembly. Some assemblies include extensions that may be biased to improve sealing capabilities.

20 Claims, 10 Drawing Sheets

CABLE SPLICE SLEEVE ASSEMBLIES

BACKGROUND

1. Field of Inventions

The field of this application and any resulting patent is cable splice sleeve assemblies.

2. Description of Related Art

Various cable splice sleeve assemblies and methods for housing cable splices, have been proposed and utilized, including some of the methods and structures disclosed in some of the references appearing on the face of this application or issued patent. However, those methods and structures lack the combination of steps and/or features of the methods and/or structures disclosed herein. Furthermore, it is contemplated that the methods and/or structures disclosed herein solve many of the problems that prior art methods and structures have failed to solve. Also, the methods and/or structures disclosed herein have benefits that would be surprising and unexpected to a hypothetical person of ordinary skill with knowledge of the prior art existing as of the filing date of this application.

SUMMARY

The disclosure herein includes cable splice sleeve assemblies, which cable splice sleeve assemblies may include: a sleeve for a lug to be disposed therein, the sleeve having: a first sleeve end for a portion of a first electrical cable terminal to be disposed therein; and a second sleeve end for a portion of a second electrical cable terminal to be disposed therein; a first gland body coupled to the first sleeve end; a first seal disposed in the first gland body for sealable coupling to the first electrical cable terminal; a first cap pressing a portion of the first gland body against the first seal; a second gland body coupled to the second sleeve end; a second seal disposed in the second gland body for sealable coupling to the second electrical cable terminal; and a second cap pressing a portion of the second gland body against the second seal.

The disclosure herein includes cable splice sleeve assemblies, which cable splice sleeve assemblies may include: A cable splice sleeve assembly, comprising: a sleeve for a lug to be disposed therein, the sleeve comprising: a first sleeve end for a portion of a first electrical cable terminal to be disposed therein, the first sleeve end having sleeve fingers; and a second sleeve end for a portion of a second electrical cable terminal to be disposed therein; a first seal disposed between the sleeve fingers; a first cap coupled to the first sleeve end and pressing a portion of the sleeve fingers against the first seal; a gland body coupled to the second sleeve end; a second seal disposed in the gland body; and a second cap coupled to the gland body and pressing a portion of the gland body against the second seal.

The disclosure herein includes cable splice sleeve assemblies, which cable splice sleeve assemblies may include: a first sleeve for a lug to be disposed therein, comprising: a first sleeve end for a portion of a first electrical cable terminal to be disposed therein; and a second sleeve end; a gland body coupled to the first sleeve end of the first sleeve; a first seal disposed in the gland body; a first cap coupled to the gland body and pressing a portion of the gland body against the first seal; and a second sleeve, comprising: a first sleeve end coupled to the second sleeve end of the first sleeve; and a second sleeve end for a portion of a second electrical cable terminal to be disposed therein, the second sleeve end having sleeve fingers; a second seal disposed between the sleeve fingers; and a second cap coupled to the second sleeve end and pressing the sleeve fingers against the second seal.

The disclosure herein includes cable splice sleeve assemblies, which cable splice sleeve assemblies may include: a first sleeve for a lug to be disposed therein, the first sleeve comprising: a first sleeve end for a portion of a first electrical cable terminal to be disposed therein, the first sleeve end having first sleeve fingers; and a second sleeve end; a first seal disposed between the first sleeve fingers; a first cap coupled to the first sleeve end and pressing the first sleeve fingers against the first seal; a second sleeve, the first sleeve comprising: a first sleeve end coupled to the second sleeve end of the first sleeve; and a second sleeve end for a portion of a second electrical cable terminal to be disposed therein, the second sleeve end having second sleeve fingers; a second seal disposed between the second sleeve fingers; and a second cap coupled to the second sleeve end and pressing the second sleeve fingers against the second seal.

The disclosure herein includes cable splice sleeve assemblies, which cable splice sleeve assemblies may include: a sleeve capable of receiving a lug; a first cable gland assembly, comprising: a gland body coupled to the sleeve; a seal disposed in the gland body; and a cap coupled to the gland body; and a second cable gland assembly, comprising: a gland body coupled to the sleeve; a seal disposed in the gland body; and a cap coupled to the gland body.

The disclosure herein includes cable splice sleeve assemblies, which cable splice sleeve assemblies may include: a first sleeve capable of receiving a lug, the first sleeve comprising: fingers; a first threaded portion; and a second threaded portion; a first seal disposed between the fingers of the first sleeve; a first cap removably coupled to the first threaded portion of the first sleeve; a second sleeve capable of receiving the lug, the second sleeve comprising: fingers; a first threaded portion removably coupled to the second threaded portion of the first sleeve; and a second threaded portion; a second seal disposed between the fingers of the second sleeve; and a second cap removably coupled to the second threaded portion of the second sleeve.

The disclosure herein includes cable splice sleeve assemblies, which cable splice sleeve assemblies may include: a sleeve capable of receiving a lug, comprising: a first end; a second end; and fingers extending from the first end; a seal disposed between the fingers of the sleeve; a cap removably coupled to the first end of the sleeve; and a cable gland assembly coupled to the second end of the sleeve.

The disclosure herein includes cable splice sleeve assemblies, which cable splice sleeve assemblies may include: a first sleeve for a portion of a lug to be disposed therein, the first sleeve comprising: a first sleeve end having a first lip for a portion of a first electrical cable terminal to extend therethrough; and a second sleeve end for a portion of the first electrical cable terminal to be disposed therein; a first seal for the first electrical cable terminal to extend through, wherein the first seal may have a first frusto-conical portion extended through the first lip; a second sleeve for a portion of the lug to be disposed therein, the second sleeve may include: a first sleeve end for a portion of a second electrical cable terminal to be disposed therein; and a second sleeve end having a second lip for a portion of the second electrical cable terminal to extend therethrough; and a second seal for the second electrical cable terminal to extend through, wherein the second seal may have a second frusto-conical portion extended through the second lip.

The disclosure herein includes cable splice sleeve assemblies, which cable splice sleeve assemblies may include: a sleeve for a lug to be disposed therein, the sleeve may include: a first sleeve end for a portion of a first electrical cable terminal to be disposed therein; and a second sleeve end having a lip for a portion of a second electrical cable terminal to extend therethrough; a first gland body coupled to the first sleeve end; a first seal disposed in the first gland body for sealable coupling to the first electrical cable terminal; a first cap pressing a portion of the first gland body against the first seal; and a second seal disposed in the second sleeve end for sealable coupling between the second sleeve end and the second electrical cable terminal.

The disclosure herein includes cable splice sleeve assemblies, which cable splice sleeve assemblies may include: a first sleeve capable of receiving a lug, the first sleeve having a lip; a first seal having a frusto-conical end extending through the lip of the first sleeve; a second sleeve capable of receiving the lug and threadably removably coupled to the first sleeve, the second sleeve having a lip: a second seal having a frusto-conical end extending through the lip of the second sleeve.

The disclosure herein includes methods for sealable housing of a first electrical cable terminal, a second electrical cable terminal, and a lug coupled to the first electrical cable terminal and the second electrical cable terminal, which methods may include: 1) extending the first electrical cable terminal through a first cap, a first seal, a first gland body, and a first sleeve end of a sleeve; 2) extending the second electrical cable terminal through a second cap, a second seal, a second gland body, and a second sleeve end of the sleeve; 3) coupling a lug to the first electrical cable terminal and the second electrical cable terminal; 4) turning the first cap and the first gland body in a first direction for threadable coupling to the first sleeve end; 5) turning the second cap and the first gland body in a second direction for threadable coupling to the second sleeve end; 6) pressing first fingers of the first gland body against the first seal; and 7) pressing second fingers of the second gland body against the second seal.

DETAILED DESCRIPTION

1. Introduction

Figure 1:
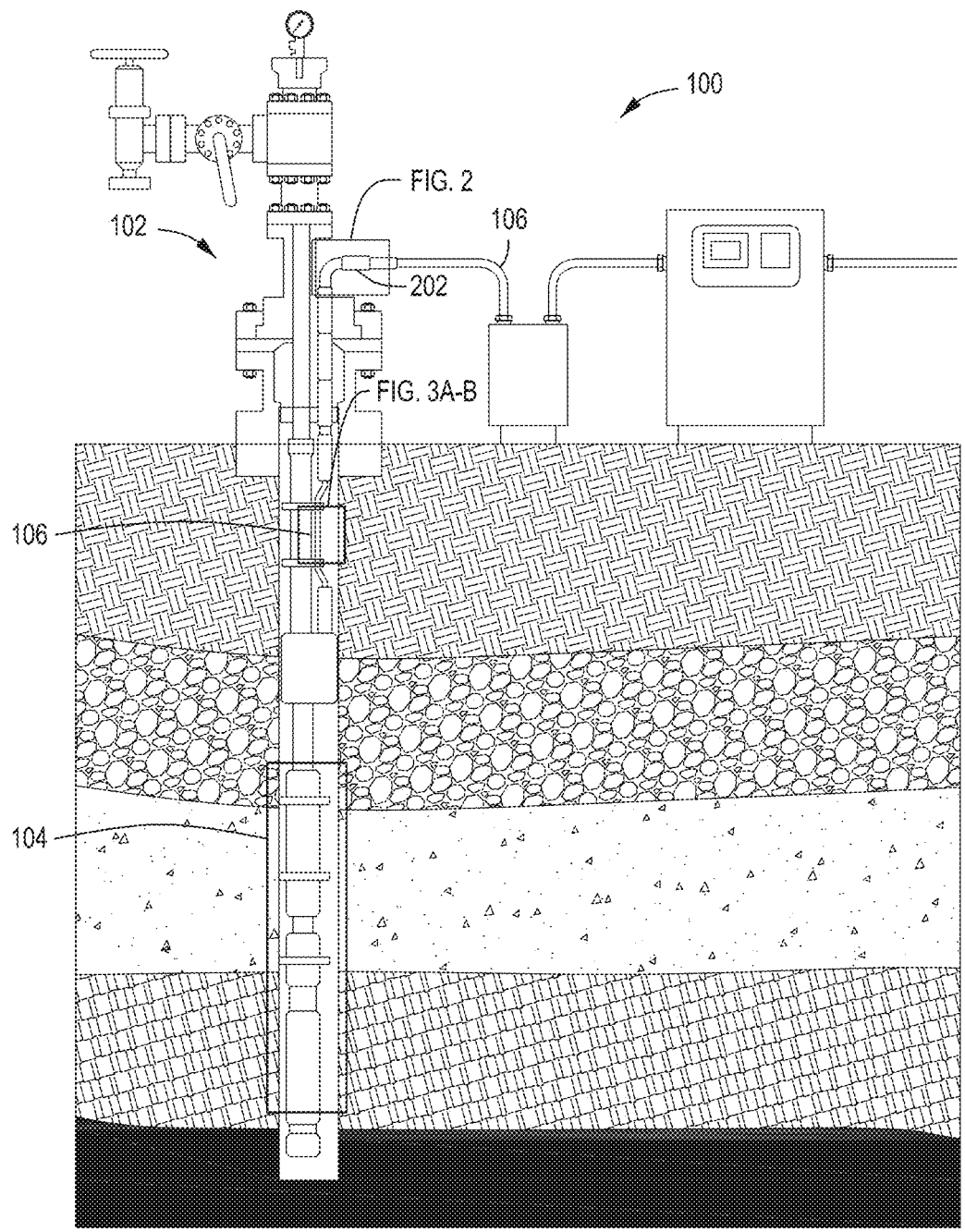
FIG. 1 illustrates a side view of an oil and gas production assembly installed at surface and extending downhole in a wellbore.

A detailed description will now be provided. The purpose of this detailed description, which includes the drawings, is to satisfy the statutory requirements of 35 U.S.C. § 112. For example, the detailed description includes a description of inventions defined by the claims and sufficient information that would enable a person having ordinary skill in the art to make and use the inventions. In the figures, like elements are generally indicated by like reference numerals regardless of the view or figure in which the elements appear. The figures are intended to assist the description and to provide a visual representation of certain aspects of the subject matter described herein. The figures are not all necessarily drawn to scale, nor do they show all the structural details, nor do they limit the scope of the claims.

Each of the appended claims defines a separate invention which, for infringement purposes, is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. Various terms as used herein are defined below, and the definitions should be adopted when construing the claims that include those terms, except to the extent a different meaning is given within the specification or in express representations to the Patent and Trademark Office (PTO). To the extent a term used in a claim is not defined below or in representations to the PTO, it should be given the broadest definition persons having skill in the art have given that term as reflected in at least one printed publication, dictionary, or issued patent.

2. Selected Definitions

Certain claims include one or more of the following terms which, as used herein, are expressly defined below.

The term "aligning" as used herein is a verb that means manufacturing, forming, adjusting, or arranging one or more physical objects into a particular position. After any aligning takes place, the objects may be fully or partially "aligned." Aligning preferably involves arranging a structure or surface of a structure in linear relation to another structure or surface; for example, such that their borders or perimeters may share a set of parallel tangential lines. In certain instances, the aligned borders or perimeters may share a similar profile. Additionally, apertures may be aligned, such that a structure or portion of a structure may extend into and/or through the apertures.

The term "aperture" as used herein is defined as any opening in a solid object or structure, e.g., sleeve, gland body, seal, cap, or tubular. For example, an aperture may be an opening that begins on one side of a solid object, e.g., sleeve, gland body, seal, cap, or tubular, and ends on the other side of the object. An aperture may alternatively be an opening that does not pass entirely through an object, but only partially passes through, e.g., as a groove. An aperture can be an opening in an object, e.g., sleeve, gland body, seal, cap, or tubular, that is completely circumscribed, defined, or delimited by the object itself. Alternatively, an aperture can be an opening in the object, e.g., sleeve, gland body, seal, cap, or tubular, when the object is combined with one or more other objects or structures. An aperture may receive an object, e.g., fingers, gland body, seal, cap, and permit ingress and/or egress of the object through the aperture. For example, a seal may be received in an aperture of a sleeve or a gland body. Additionally, a portion of an electrical cable may be received in an aperture of a sleeve, a gland body, a seal, and/or a cap. A surface defining an aperture may have a shoulder extending radially therefrom, e.g., inwardly or outwardly.

The term "assembly" as used herein is defined as any set of components that have been fully or partially assembled together. A group of assemblies may be coupled to form a solid body having an inner surface and an outer surface.

The term "cable gland assembly" as used herein is defined as an assembly capable of being removably coupled to a portion of an electrical cable and/or a sleeve. A cable gland assembly may include a gland body, a seal, and/or a cap. A cable gland assembly may include an aperture disposed therethrough, through which a portion of an electrical cable, e.g., terminal, may extend.

The term "cap" as used herein is defined as a structure capable of being removably coupled to a gland body or a sleeve. A cap may be constructed from high-dielectric material, e.g., plastic, polyamide, polyvinyl chloride (PVC), polyvinylidene fluoride or polyvinylidene difluoride (PVDF). A cap may be constructed from metal, e.g., aluminum, titanium, brass, stainless steel A cap may have pin threads, e.g., male threads, capable of being coupled with box threads, e.g., female threads, of a gland body and/or a sleeve. A cap may have box threads, e.g., female threads, capable of being coupled with pin threads, e.g., male threads, of a gland body and/or a sleeve. A cap may have a lip that is radiused. A cap may have a lip that is tapered. A cap may have a lip having a frusto-conical surface. A cap may have a lip that may be slidably abutted against fingers of a sleeve or a gland body. A cap may have a lip capable of receiving a portion of an electrical cable, e.g., terminal, therethrough. A cap may have an aperture through which a portion, e.g., terminal, of an electrical cable may extend. A seal may be disposed within an aperture of a lip of a cap, in which the seal and the lip are concentric (see, e.g., FIG. 9).

The term "coupled" as used herein is defined as directly or indirectly connected, attached, or unitary, e.g., part of A first object may be coupled to a second object such that the first object is positioned at a specific location and orientation with respect to the second object. For example, a sleeve may be coupled to cable gland assembly or cap. A first object may be either permanently, removably, threadably, and/or sealably coupled to a second object. Two objects may be removably coupled to each other via threads, tape, latches, hooks, fasteners, locks, male and female connectors, clips, and/or clamps. For instance, a sleeve and a cable gland assembly may be removably coupled to each other such that the sleeve may then be uncoupled and removed from the cable gland assembly. In addition, a cable splice sleeve assembly may be coupled to an electrical cable such that the cable splice sleeve assembly and the electrical may then be uncoupled. Also, two objects may be capable of being slidably coupled together, e.g., where an inner aperture of one object is capable of receiving a second object. Thus, a sleeve, a gland body, a seal, and/or a cap having apertures disposed therethrough may receive a portion, e.g., terminal, of an electrical cable. Additionally, two objects may be capable of being threadably coupled, e.g., where a threaded outer surface of one object is capable of engaging with or to a threaded inner surface of another object. Threadably coupled objects may be removably coupled. Accordingly, a sleeve may be threadably coupled to a gland body where a threaded inner surface, e.g., box threads or female threads, of the sleeve may be engaged with a threaded outer surface, e.g., pin threads or male threads, of the gland body. Also, a sleeve may be threadably coupled to a cap where a threaded inner surface, e.g., box threads or female threads, of the cap may be engaged with a threaded outer surface, e.g., pin threads or male threads, of the sleeve. Moreover, two objects may be capable of being sealably coupled, e.g., where portions of the surfaces of the objects are capable of being abutted against each other so as to inhibit passage of fluid, gas, and/or particles between the portions of the surfaces. For example, a seal may be pressed or biased, e.g., by fingers, inward towards a central axis such that an inner surface of the seal may be abutted against and outer surface of an electric cable. Additionally, a seal may be pressed or biased inward, e.g., by fingers, to cause the seal to be deformed around an electric cable such that the inner surface of the seal may abutted against the outer surface of an electric cable. A seal that is sealably coupled to an electrical cable may inhibit passage of fluid, gas, and/or particles between the seal and the electrical cable.

The term "cylindrical" as used herein is defined as shaped like a cylinder, e.g., having straight parallel sides and a circular or oval or elliptical cross-section. A cylindrical body or structure, e.g., sleeve, gland body, seal, cap, or electrical cable, may be completely or partially shaped like a cylinder. A cylindrical body, e.g., sleeve, gland body, seal, cap, or electrical cable, that has an inner or outer diameter that changes abruptly may have a lip, e.g., radial face, rim, or collar (see, e.g., 402, FIGS. 2-4). A lip may extend toward or away from the center axis of a cylinder. A cylindrical object may have a lip extending toward or away from the central axis line of the object. A cylindrical object may have a lip disposed on an inner surface. A cylindrical object may have a lip disposed on an outer surface. Additionally, a cylindrical body, e.g., sleeve, gland body, seal, cap, or electrical cable, may have a lip that is tapered or radiused. A cylindrical body may have an aperture extending through the entire length of the body to form a hollow cylinder that is capable of permitting another body, e.g., sleeve, gland body, seal, or cap, to extend or pass through.

The term "epoxy" as used herein is defined as a material capable of sealing surfaces of two objects, e.g., sleeve, seal, gland body, cap, lug, and electrical cable. An epoxy may be coupled to a sleeve, a seal, a gland body, a cap, a lug, and an electrical cable. A technician may couple or cover a component, e.g., sleeve, seal, gland body, cap, lug, and/or electrical cable, with epoxy when assembling the component with a portion of a cable splice sleeve assembly. An epoxy may be adhesive, plastic, paint or resin. An epoxy may be material made from thermosetting polymers containing epoxide groups. In any one of structures disclosed, e.g., FIGS. 4-10, an epoxy may be used to create a seal. Such epoxy may be introduced during manufacturing in liquid or semi-liquid form and cured at ambient conditions.

The terms "first" and "second" as used herein merely differentiate two or more things or actions, and do not signify anything else, including order of importance, sequence, etc.

The term "finger" as used herein is defined as a structure extending from another structure, e.g., sleeve or cap. A finger may be elongated. A finger may extend axially from an end of a structure, e.g. sleeve or cap. A finger may be spaced radially on a structure, e.g. sleeve or cap. A finger may have an inner surface and an outer surface. A finger may have an outer surface capable of being abutted against a lip of a cap. A finger may have an inner surface capable of being abutted against a seal. A finger may be resiliently biased. A finger may be spaced radially on a structure, e.g. sleeve or cap. A plurality of fingers disposed radially as a part of an object, e.g., sleeve or gland body, may form a compressible portion of the object.

The term "gland body" as used herein is defined as a structure capable of removable coupling to a sleeve and/or a cap. A gland body may be constructed from high-dielectric material, e.g., plastic, polyamide, polyvinyl chloride (PVC), polyvinylidene fluoride or polyvinylidene difluoride (PVDF). A gland body may be constructed from metal, e.g., aluminum, titanium, brass, stainless steel. A gland body may have pin threads, e.g., male threads, capable of engagement with box threads, e.g., female threads, of a sleeve and/or a cap. A gland body may have box threads, e.g., female threads, capable of engagement with pin threads, e.g., male threads, of a sleeve and/or a cap. A gland body may have an aperture disposed therethrough, which aperture is capable is capable of having a portion of an electrical cable, e.g., terminal, extending therethrough. A gland body may have fingers dispose at an end of the gland body. A gland body may have fingers disposed axially to the length of the gland body. A gland body may have fingers disposed parallel with a central axis of the gland body. A gland body may have fingers for receiving a seal between the fingers. A gland body may have fingers that form an aperture for receiving a seal within the aperture. A gland body may have fingers capable of being slidably abutted against a lip of a cap.

The term "lug" as used herein is defined as a structure for coupling a first electrical cable to a second electrical cable. A lug may be cylindrical. A lug may receive an electrical cable. A lug may conduct electricity. A lug may have an aperture disposed perpendicular to a central axis of the lug. A lug may have an aperture disposed parallel to a central axis of the lug. A lug may have a first aperture and a second aperture that intersect each other.

Figure 6:
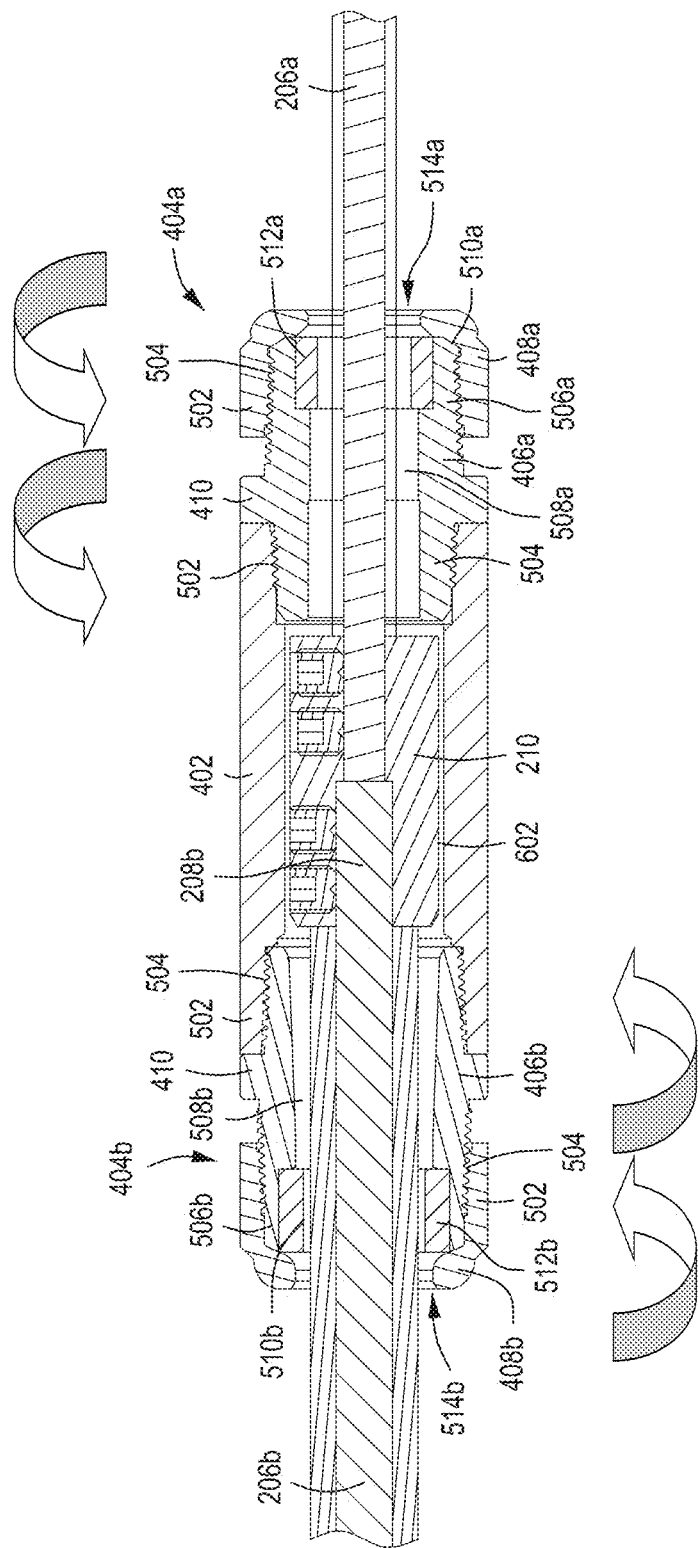
FIG. 6 illustrates a cross-sectional view of a cable splice sleeve assembly removably coupled to two spliced cables.
Figure 7:
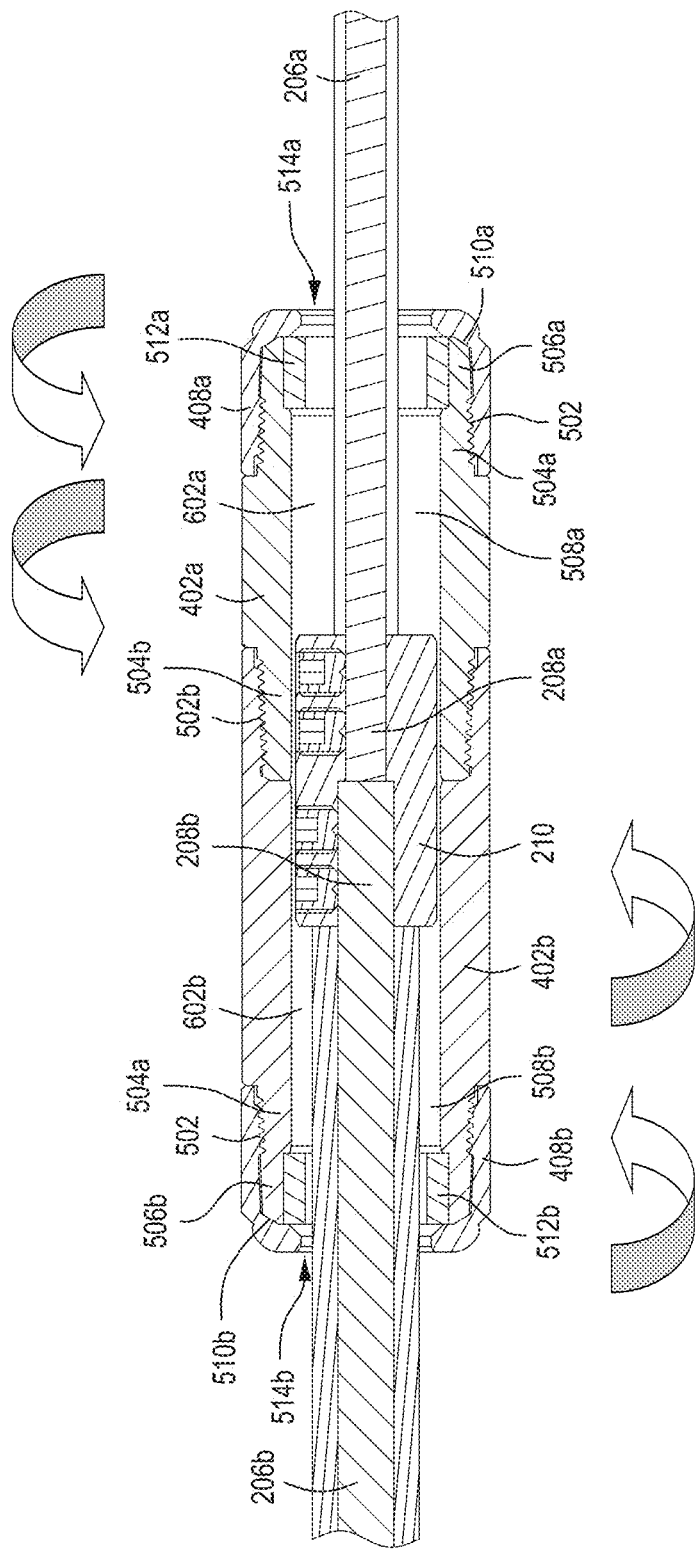
FIG. 7 illustrates a cross-sectional view of a cable splice sleeve assembly having two sleeves coupled to each other, and each sleeve coupled to a cap.
Figure 8:
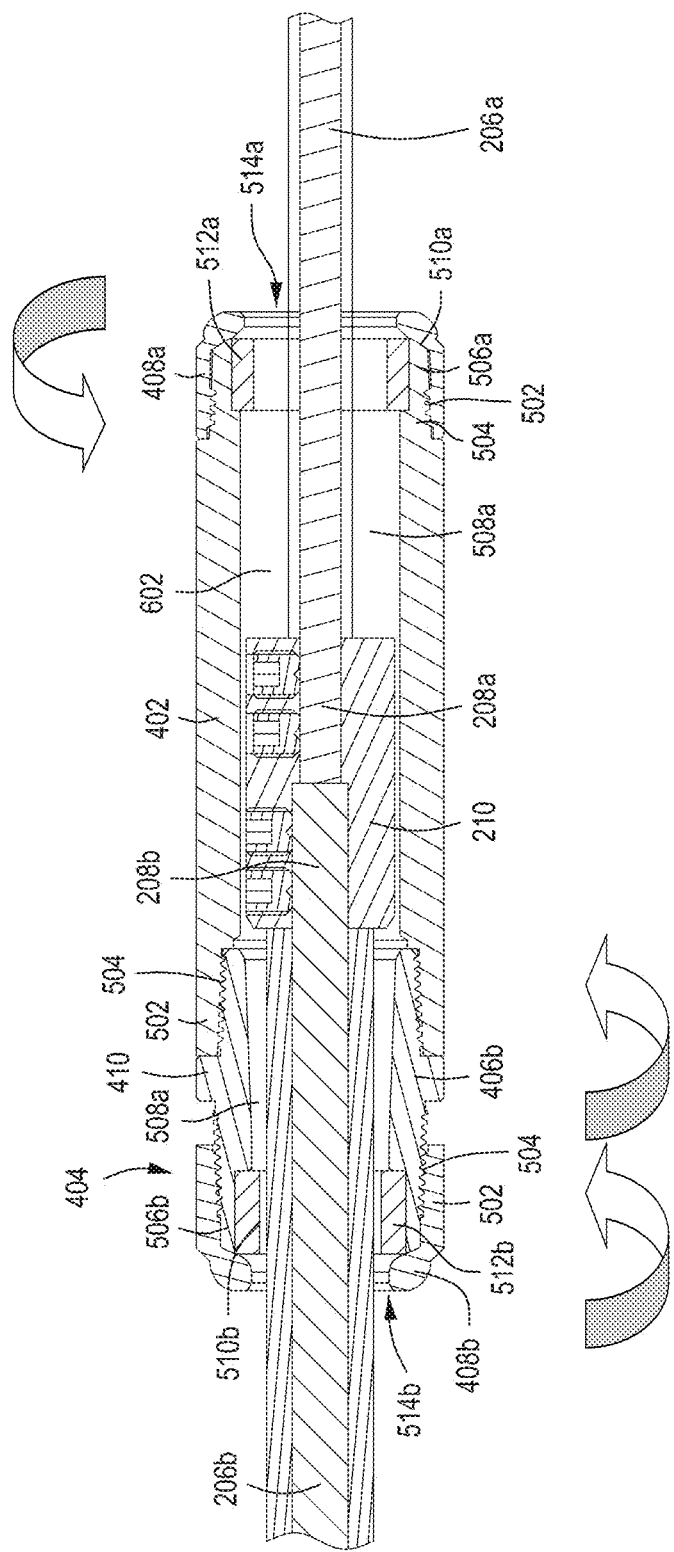
FIG. 8 illustrates a cross-sectional view of a cable splice sleeve assembly having a sleeve having a first end removably coupled to a cap and a second end removably coupled to a cable gland assembly.

The term "non-threaded" as used herein is defined as having no threads. A non-threaded portion may be any portion of a structure or surface that has no threads. A non-threaded portion may, for example, refer to a cylindrical substructure of a sleeve with two opposing circular ends and a smooth or substantially smooth outer surface with no threads on any part of the outer surface. A sleeve, a cap, and/or a gland may each include a "threaded portion" wherein a section of the sleeve includes a section of the sleeve without threads, e.g., a smooth portion of a sleeve. As shown in FIGS. 6-8, a non-threaded portion of a sleeve may, for example, have a diameter sized so that a lug can be received in an aperture of the sleeve.

The term "perpendicular" as used herein is defined as at an angle of substantially 90°, e.g., to a line, a plane, or a surface, e.g., ranging from 85° or 88 to 92° or 95°. Two structures that are perpendicular to each other may be orthogonal and/or tangential to each other.

The term "providing" as used herein is defined as making available, furnishing, supplying, equipping, or causing to be placed in position.

The term "seal" as used herein used as a noun is defined as a structure capable of sealably coupling to an electrical cable. A seal may be deformed, e.g., by fingers, around an electrical cable to sealably couple to the electrical cable. A seal may be disposed between fingers of a sleeve or a gland body. In other words, fingers may be disposed around a seal. A seal may be biased by fingers of a sleeve or a gland body. A seal may be constructed from high-dielectric material, e.g., elastomer, plastic, latex, rubber, nitrile rubber, butyl rubber, silicone, neoprene, and/or polyvinyl chloride. A seal may be constructed from resilient material, e.g., elastomer, plastic, latex, rubber, nitrile rubber, butyl rubber, silicone, neoprene, and/or polyvinyl chloride. A seal may be disposed between threaded portions, e.g., box threads and pin threads, that are coupled. A seal may have frusto-conical, e.g., tapered, end. A seal may have frusto-conical, e.g., tapered, end and a cylindrical end. A seal may have circumferential groove disposed between a frusto-conical, e.g., tapered, end and a cylindrical end. A seal may have frusto-conical, e.g., tapered, end that is capable of extending through a lip of a sleeve. The term "seal" used herein used as a verb means to inhibit ingress and/or egress.

The term "sleeve" as used herein is defined as a structure capable of removably coupling to an object, e.g., sleeve, cap, seal, splice, and/or terminal of an electrical cable. A sleeve may be cylindrical. A sleeve may be constructed from high-dielectric material, e.g., plastic, polyamide, polyvinyl chloride (PVC), polyvinylidene fluoride or polyvinylidene difluoride (PVDF). A sleeve may be constructed from metal, e.g., aluminum, titanium, brass, stainless steel A sleeve may have an aperture capable of receiving a lug such that the splice, in some cases, may not be in physical contact with the non-threaded portion of the sleeve. A sleeve may have fingers dispose at an end of the sleeve. A sleeve may have fingers disposed axially to the length of the sleeve. A sleeve may be constructed from high-dielectric material, e.g., plastic, polyamide, polyvinyl chloride, polyvinylidene fluoride or polyvinylidene difluoride. A sleeve may have fingers disposed parallel with a central axis of the sleeve. A sleeve may have fingers for receiving a seal between the fingers. A sleeve may have fingers that form an aperture for receiving a seal within the aperture. A sleeve may have fingers capable of being slidably abutted against a lip of a cap. A sleeve may have a threaded portion having a first diameter and a non-threaded portion having a second diameter. A sleeve may have a threaded portion having a first diameter and a non-threaded portion having a second diameter that is smaller than or equal to the first diameter of the threaded portion. Also, a sleeve having a non-threaded portion capable of receiving a lug such that the splice, in some cases, may not be in physical contact with the non-threaded portion of the sleeve. Preferably, a sleeve has an internal shoulder capable of being abutted against another sleeve, a cable gland assembly, a gland body, or a cap. Additionally, a sleeve may have an external shoulder capable of being abutted against another sleeve, a cable gland assembly, a gland body, or a cap. A sleeve may have an axial bore through which a lug may pass or extend. In other words, the lug may enter a first end of the sleeve and exit a second end of the sleeve. A sleeve may have pin threads capable of being coupled to box threads of a gland body, a cap, or another sleeve. A sleeve may have box threads capable of being coupled to box threads of a gland body, a cap, or another sleeve.

The term "splice" as used herein as a verb, e.g., spliced and splicing, is defined as to directly or indirectly couple two or more objects, e.g., electrical cables. The term "splice" as used herein as a noun is defined as a characteristic or quality of being spliced together, e.g., a union. For instance, a splice may exist between two electrical cables that are coupled, e.g., electrically, and/or physically, to a lug. Electricity can flow between two spliced electrical cables.

The term "socket surfaces" as used herein is defined as connected surfaces having a polygonal cross-section. An example of a polygonal cross-section may be triangular, square, rectangular, pentagonal, hexagonal, or octagonal. Socket surfaces may have planar walls connected to form a polygonal, e.g., triangular, square, rectangular, pentagonal, hexagonal, or octagonal, shape. Males socket surfaces may be disposed on an outer surface of a cylindrical structure, e.g., sleeve, gland body, cap, rod, or bolt. Female socket surfaces may be disposed on an inner surface of a cylindrical structure, e.g., sleeve, gland body, cap, rod, or bolt. Socket surfaces may be coupled to a wrench, e.g., socket wrench and/or a crescent wrench.

The term "surface" as used herein is defined as any face of a structure. A surface may also refer to that flat or substantially flat area that is extended radially around a cylinder which may, for example, be part of a sleeve, a cable gland assembly, gland body, a seal, or a cap. A surface may have irregular contours. A surface may be formed from components, e.g. sleeves, cable gland assemblies, gland bodies, seals, and/or caps, coupled together. Coupled components may form irregular surfaces.

The term "surface connection assembly" as used herein is defined as an assembly to which electrical cables may be coupled. A surface connection assembly may include a housing and/or a cable splice sleeve assembly.

The term "terminal" as used herein is defined as an end portion of an electrical cable. A terminal may include an insulated portion and a conductive portion. The insulated portion may also be referred to as a cover, a cladding, or a sheath. The conductive portion may be exposed and/or unsheathed, e.g., have not cover. A terminal may have a conductive portion disposed within an insulated portion. A terminal may have a conductive portion extending from a sheathed portion. A first terminal may be electrically coupled to a second terminal, e.g., via a lug.

The term "threaded" as used herein is defined as having threads. Threads may include one or more helical protrusions or grooves on a surface of a cylindrical object. Each full rotation of a protrusion or groove around a threaded surface of the object is referred to herein as a single "thread." Threads formed on an inner surface of an object, e.g., sleeve, gland body, seal, or cap, may be referred to as box threads or female threads. Threads formed on an outer surface of an object, e.g., sleeve, gland body, seal, or cap, may be referred to as pin threads or male threads. A threaded assembly may include a "threaded portion" wherein a section of the threaded assembly includes threads, e.g., pin threads or box threads. A threaded portion may have a diameter sized to extend through an aperture of a module coupler body. In certain cases, a threaded portion of a structure may be removably coupled to a threaded assembly.

The term "tubular" as used herein is defined any structure having an inner surface and an outer surface. A tubular may have an aperture disposed therethrough. Preferably, a tubular is cylindrical. However, any or all tubulars of an assembly, e.g., sleeve, gland body, seal, or cap, may have polygonal cross-sections, e.g., triangular, rectangular, pentagonal, hexagonal, or octagonal.

The term "unitary" as used herein defined as having the nature, properties, or characteristics of a single unit. For example, a sleeve portion and fingers that are distinct parts of a sleeve are unitary in the sense they work together to fulfill the intended purpose of the sleeve. A unitary sleeve may be formed, e.g., mold or carved, from a single piece of material, e.g. of plastic, carbon fiber, metal, or wood.

The terms "upper," "lower," "top," "bottom" as used herein are relative terms describing the position of one object, thing, or point positioned in its intended useful position, relative to some other object, thing, or point also positioned in its intended useful position, when the objects, things, or points are compared to distance from the center of the earth. The term "upper" identifies any object or part of a particular object that is farther away from the center of the earth than some other object or part of that particular object, when the objects are positioned in their intended useful positions. The term "lower" identifies any object or part of a particular object that is closer to the center of the earth than some other object or part of that particular object, when the objects are positioned in their intended useful positions. For example, a wellbore may have an upper end and a lower end. Additionally, a cylindrical object, e.g., sleeve, gland body, seal, cap, or electrical cable, may have an upper portion and a lower portion. The term "top" as used herein means in the highest position, e.g., farthest from the ground. The term "bottom" as used herein means in the lowest position, e.g., closest the ground. For example, a cylindrical object, e.g., sleeve, gland body, seal, cap, or electrical cable, may have a top portion and a bottom portion.

3. Certain Specific Embodiments

The disclosure herein includes cable splice sleeve assemblies, which cable splice sleeve assemblies may include: a sleeve for a lug to be disposed therein, the sleeve having: a first sleeve end for a portion of a first electrical cable terminal to be disposed therein; and a second sleeve end for a portion of a second electrical cable terminal to be disposed therein; a first gland body coupled to the first sleeve end; a first seal disposed in the first gland body for sealable coupling to the first electrical cable terminal; a first cap pressing a portion of the first gland body against the first seal; a second gland body coupled to the second sleeve end; a second seal disposed in the second gland body for sealable coupling to the second electrical cable terminal; and a second cap pressing a portion of the second gland body against the second seal.

The disclosure herein includes cable splice sleeve assemblies, which cable splice sleeve assemblies may include: A cable splice sleeve assembly, comprising: a sleeve for a lug to be disposed therein, the sleeve comprising: a first sleeve end for a portion of a first electrical cable terminal to be disposed therein, the first sleeve end having sleeve fingers; and a second sleeve end for a portion of a second electrical cable terminal to be disposed therein; a first seal disposed between the sleeve fingers; a first cap coupled to the first sleeve end and pressing a portion of the sleeve fingers against the first seal; a gland body coupled to the second sleeve end; a second seal disposed in the gland body; and a second cap coupled to the gland body and pressing a portion of the gland body against the second seal.

The disclosure herein includes cable splice sleeve assemblies, which cable splice sleeve assemblies may include: a first sleeve for a lug to be disposed therein, comprising: a first sleeve end for a portion of a first electrical cable terminal to be disposed therein; and a second sleeve end; a gland body coupled to the first sleeve end of the first sleeve; a first seal disposed in the gland body; a first cap coupled to the gland body and pressing a portion of the gland body against the first seal; and a second sleeve, comprising: a first sleeve end coupled to the second sleeve end of the first sleeve; and a second sleeve end for a portion of a second electrical cable terminal to be disposed therein, the second sleeve end having sleeve fingers; a second seal disposed between the sleeve fingers; and a second cap coupled to the second sleeve end and pressing the sleeve fingers against the second seal.

The disclosure herein includes cable splice sleeve assemblies, which cable splice sleeve assemblies may include: a first sleeve for a lug to be disposed therein, the first sleeve comprising: a first sleeve end for a portion of a first electrical cable terminal to be disposed therein, the first sleeve end having first sleeve fingers; and a second sleeve end; a first seal disposed between the first sleeve fingers; a first cap coupled to the first sleeve end and pressing the first sleeve fingers against the first seal; a second sleeve, the first sleeve comprising: a first sleeve end coupled to the second sleeve end of the first sleeve; and a second sleeve end for a portion of a second electrical cable terminal to be disposed therein, the second sleeve end having second sleeve fingers; a second seal disposed between the second sleeve fingers; and a second cap coupled to the second sleeve end and pressing the second sleeve fingers against the second seal.

The disclosure herein includes cable splice sleeve assemblies, which cable splice sleeve assemblies may include: a sleeve capable of receiving a lug; a first cable gland assembly, comprising: a gland body coupled to the sleeve; a seal disposed in the gland body; and a cap coupled to the gland body; and a second cable gland assembly, comprising: a gland body coupled to the sleeve; a seal disposed in the gland body; and a cap coupled to the gland body.

The disclosure herein includes cable splice sleeve assemblies, which cable splice sleeve assemblies may include: a first sleeve capable of receiving a lug, the first sleeve comprising: fingers; a first threaded portion; and a second threaded portion; a first seal disposed between the fingers of the first sleeve; a first cap removably coupled to the first threaded portion of the first sleeve; a second sleeve capable of receiving the lug, the second sleeve comprising: fingers; a first threaded portion removably coupled to the second threaded portion of the first sleeve; and a second threaded portion; a second seal disposed between the fingers of the second sleeve; and a second cap removably coupled to the second threaded portion of the second sleeve.

The disclosure herein includes cable splice sleeve assemblies, which cable splice sleeve assemblies may include: a sleeve capable of receiving a lug, comprising: a first end; a second end; and fingers extending from the first end; a seal disposed between the fingers of the sleeve; a cap removably coupled to the first end of the sleeve; and a cable gland assembly coupled to the second end of the sleeve.

The disclosure herein includes cable splice sleeve assemblies, which cable splice sleeve assemblies may include: a first sleeve capable of receiving a lug, the first sleeve having a lip; a first seal having a frusto-conical end extending through the lip of the first sleeve; a second sleeve capable of receiving the lug and threadably removably coupled to the first sleeve, the second sleeve having a lip: a second seal having a frusto-conical end extending through the lip of the second sleeve.

The disclosure herein includes cable splice sleeve assemblies, which cable splice sleeve assemblies may include: a first sleeve for a portion of a lug to be disposed therein, the first sleeve comprising: a first sleeve end having a first lip for a portion of a first electrical cable terminal to extend therethrough; and a second sleeve end for a portion of the first electrical cable terminal to be disposed therein; a first seal for the first electrical cable terminal to extend through, wherein the first seal may have a first frusto-conical portion extended through the first lip; a second sleeve for a portion of the lug to be disposed therein, the second sleeve may include: a first sleeve end for a portion of a second electrical cable terminal to be disposed therein; and a second sleeve end having a second lip for a portion of the second electrical cable terminal to extend therethrough; and a second seal for the second electrical cable terminal to extend through, wherein the second seal may have a second frusto-conical portion extended through the second lip.

The disclosure herein includes cable splice sleeve assemblies, which cable splice sleeve assemblies may include: a sleeve for a lug to be disposed therein, the sleeve may include: a first sleeve end for a portion of a first electrical cable terminal to be disposed therein; and a second sleeve end having a lip for a portion of a second electrical cable terminal to extend therethrough; a first gland body coupled to the first sleeve end; a first seal disposed in the first gland body for sealable coupling to the first electrical cable terminal; a first cap pressing a portion of the first gland body against the first seal; and a second seal disposed in the second sleeve end for sealable coupling between the second sleeve end and the second electrical cable terminal.

The disclosure herein includes methods for sealable housing of a first electrical cable terminal, a second electrical cable terminal, and a lug coupled to the first electrical cable terminal and the second electrical cable terminal, which methods may include: 1) extending the first electrical cable terminal through a first cap, a first seal, a first gland body, and a first sleeve end of a sleeve; 2) extending the second electrical cable terminal through a second cap, a second seal, a second gland body, and a second sleeve end of the sleeve; 3) coupling a lug to the first electrical cable terminal and the second electrical cable terminal; 4) turning the first cap and the first gland body in a first direction for threadable coupling to the first sleeve end; 5) turning the second cap and the first gland body in a second direction for threadable coupling to the second sleeve end; 6) pressing first fingers of the first gland body against the first seal; and 7) pressing second fingers of the second gland body against the second seal.

In any one of the methods or structures disclosed herein, the sleeve, the first gland body, the first seal, the first cap, the second gland body, the second seal, and the second cap may be capable of forming a sealed chamber around the first electrical cable terminal, the second electrical cable terminal, and the lug.

In any one of the methods or structures disclosed herein, the first gland body may have an inner surface having a diameter less than a diameter of the lug.

In any one of the methods or structures disclosed herein, the second gland body may have an inner surface having a diameter less than a diameter of the lug.

In any one of the methods or structures disclosed herein, the first cap may have a lip abutted against first fingers of the first gland body.

In any one of the methods or structures disclosed herein, the second cap may have a lip abutted against second fingers of the second gland body.

In any one of the methods or structures disclosed herein, the sleeve end may have box threads coupled to pin threads disposed on the first gland body.

In any one of the methods or structures disclosed herein, the second sleeve end may have box threads coupled to pin threads disposed on the second gland body.

In any one of the methods or structures disclosed herein, the first cap may have a lip abutted against the sleeve fingers.

In any one of the methods or structures disclosed herein, the second cap may have a lip abutted against fingers of the gland body.

In any one of the methods or structures disclosed herein, the first cap may have a lip abutted against the first sleeve fingers.

In any one of the methods or structures disclosed herein, the second cap may have a lip abutted against the second sleeve fingers.

In any one of the methods or structures disclosed herein, the gland body of the first cable gland assembly and the gland body of the second cable gland assembly may each include fingers.

In any one of the methods or structures disclosed herein, the gland body of the first cable gland assembly and the gland body of the second cable gland assembly may each include fingers capable being biased a cap.

In any one of the methods or structures disclosed herein, the gland body of the first cable gland assembly and the gland body of the second cable gland assembly may each include fingers capable being biased against a seal.

In any one of the methods or structures disclosed herein, the first cable gland assembly and the second cable gland assembly may each include a cap.

In any one of the methods or structures disclosed herein, the first cable gland assembly and the second cable gland assembly may each include a seal.

In any one of the methods or structures disclosed herein, the sleeve may include an aperture disposed therethrough for receiving a terminal of a first electrical cable, a terminal of a second electrical cable, and the lug.

In any one of the methods or structures disclosed herein, the sleeve may include socket surfaces.

In any one of the methods or structures disclosed herein, the first cable gland assembly may be capable of being sealably coupled to the first electrical cable and the second cable gland assembly may be capable of being sealably coupled to the second electrical cable.

In any one of the methods or structures disclosed herein, the first cable gland assembly and the second cable gland assembly may each include socket surfaces.

In any one of the methods or structures disclosed herein, the first cable gland assembly and the second cable gland assembly may each include: a gland body having fingers; a seal disposed between the fingers; and a cap having a lip capable of being abutted against the fingers, wherein a terminal of an electrical cable is capable of extending through the cap, the seal, the gland body, and the sleeve.

In any one of the methods or structures disclosed herein, a terminal of the first cable may be capable of extending through the first cap, the first seal, and the sleeve and a terminal of the second electrical cable may be capable of extending through the second cap, the second seal, and the second sleeve.

In any one of the methods or structures disclosed herein, the first cap may have a lip capable of being abutted against the fingers of the first sleeve and the second cap may have a lip capable of being abutted against the fingers of the second sleeve.

In any one of the methods or structures disclosed herein, the first seal may be capable of being sealably coupled to the first electrical cable and the second seal may be capable of being sealably coupled to the second electrical cable.

In any one of the methods or structures disclosed herein, the seal may be capable of being sealably coupled to a first electrical cable and the cable gland assembly may be capable of being sealably coupled to a second electrical cable.

In any one of the methods or structures disclosed herein, a terminal of a first electrical cable may capable of extending through the cap, the seal, and the first end of the sleeve and a terminal of a second electrical cable may be capable of extending through the cable gland assembly and the second end of the sleeve.

In any one of the methods or structures disclosed herein, the cable gland assembly may include: a gland body having fingers; a seal disposed between the fingers; and a cap having a lip capable of being abutted against the fingers.

In any one of the methods or structures disclosed herein, a terminal of an electrical cable may be capable of extending through the cap, the seal, the gland body, and the sleeve.

In any one of the methods or structures disclosed herein, a terminal of the first cable may be capable of being slidably abutted against the first seal and the terminal of the second electrical cable may be capable of being slidably abutted against the second seal.

In any one of the methods or structures disclosed herein, the frusto-conical end of the first seal may be disposed in the first sleeve and the frusto-conical end of the second seal may be disposed in the second sleeve.

In any one of the methods or structures disclosed herein, the first frusto-conical portion of the first seal may be abutted against an inner wall of the first lip.

In any one of the methods or structures disclosed herein, the second frusto-conical portion of the second seal may be abutted against an inner wall of the second lip.

In any one of the methods or structures disclosed herein, the second seal may be capable of being abutted against the lip.

Any one of the methods disclosed herein may further include deforming the first seal and the second seal.

Any one of the methods disclosed herein may further include abutting a portion of the first seal against the first electrical cable terminal and abutting a portion of the second seal against the second electrical cable terminal.

In any one of the methods or structures disclosed herein, the first direction of turning of the first cap and the first gland body may be opposite the second direction of turning the second cap and the first gland body.

4. Specific Embodiments in the Drawings

The drawings presented herein are for illustrative purposes only and do not limit the scope of the claims. Rather, the drawings are intended to help enable one having ordinary skill in the art to make and use the claimed inventions.

This section addresses specific versions of cable splice sleeve assemblies shown in the drawings, which relate to assemblies, elements and parts that can be part of a cable splice sleeve assembly, and methods for housing cable splices. Although the methods, structures, elements, and parts described herein have been described in detail, it should be understood that various changes, substitutions, and alterations can be made without departing from the spirit and scope of the inventions as defined by the following claims. Those skilled in the art may be able to study the preferred embodiments and identify other ways to practice the inventions that are not exactly as described herein. It is the intent of the inventors that variations and equivalents of the inventions are within the scope of the claims, while the description, abstract and drawings are not to be used to limit the scope of the inventions. The inventions are specifically intended to be as broad as the claims below and their equivalents.

FIG. 1 illustrates a side view of an oil and gas production assembly 100. The production assembly 100 may include a wellhead 102 and a pump 104 positioned downhole within the wellbore. The wellhead 102 may be installed at the surface proximate the entrance to the wellbore.

The wellhead 102 may include electrical components, e.g., motors, sensors and valves, for monitoring and controlling flow of fluid, e.g., hydrocarbons, gas, and/or water, extracted from the wellbore. Also, the pump 104 may include electrical components, e.g. motors, sensors, and valves, to propel and control the of flow fluid, e.g., hydrocarbons, gas, and/or water, up to the wellhead 102.

Electrical cables 106 from a power source 103 may be coupled to the wellhead 102 so electrical power may be delivered to the electrical components of the wellhead 102. Furthermore, electrical cables 106 may extend through the wellhead 102 and may be coupled to the pump 104 so electrical power may be delivered to the electrical components of the pump 104, as shown in FIG. 1.

In some cases, the electrical cables 106 may not be continuous so components can be easily replaced or removed for repairs. In other cases, continuous electrical cables 106 may be cut so components can be removed for repair or replacement. Ultimately, the terminals of electrical cables may be spliced so electrical power may be transferred between the electrical cables. The wellhead 102 may include a surface connection assembly 202 (FIG. 2).

Figure 2:
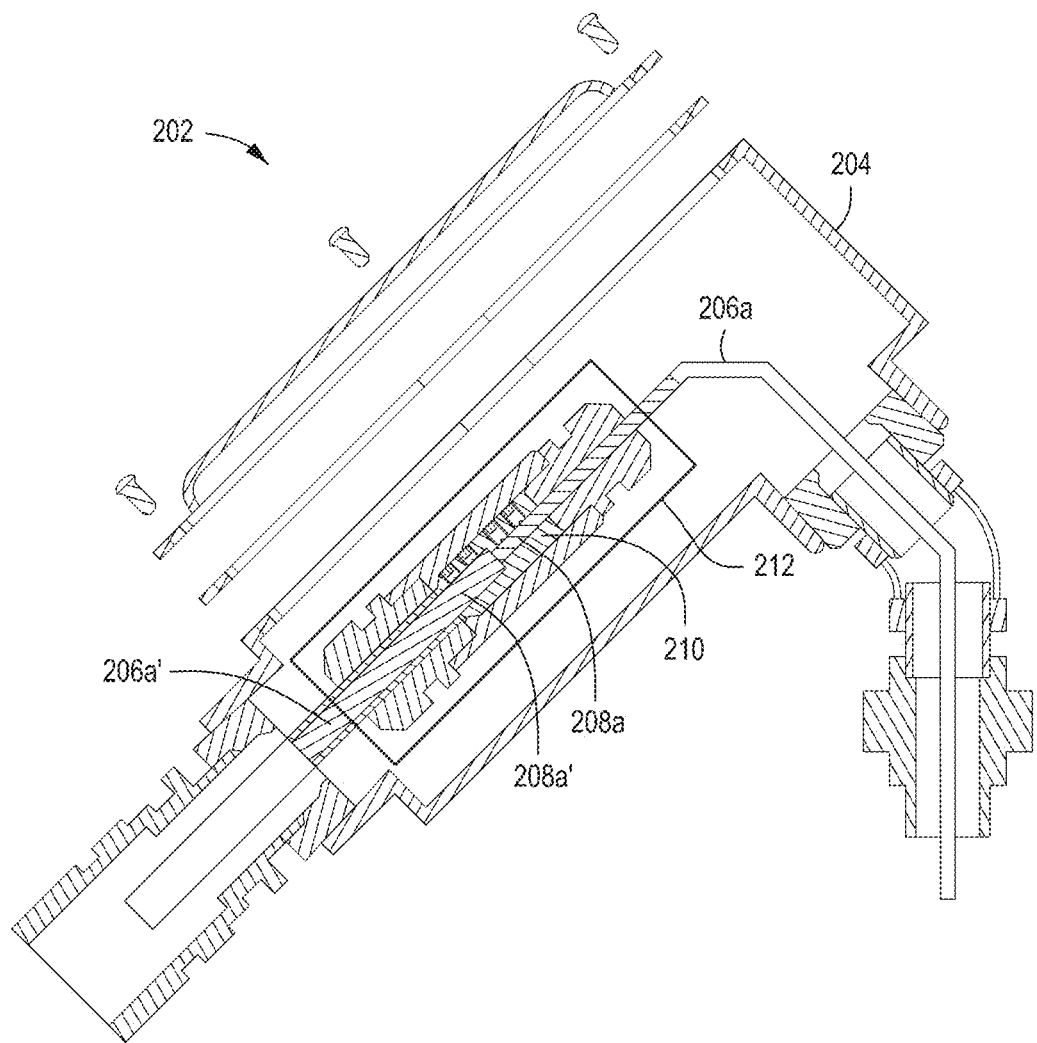
FIG. 2 illustrates a cross-sectional side view of a cable splice sleeve assembly disposed in a surface connection assembly of a wellhead.

FIG. 2 illustrates a cross-sectional side view of a cable splice sleeve assembly 212 disposed in a surface connection assembly 202 of a wellhead 102. The surface connection assembly 202 may include a housing 204 containing a first electrical cable 206a and a second electrical cable 206a' may have terminals 208a, 208a' spliced by a lug 210. Portions of the electrical cables 206a, 206a' (including the terminals 208a, 208a') and the lug 210 may be housed within the housing 204.

Additionally, the cable splice sleeve assembly 212 may be removably coupled to portions of the electrical cables 206a, 206a' to sealably house the terminals 208a, 208a' and the lug 210.

Figure 3A:
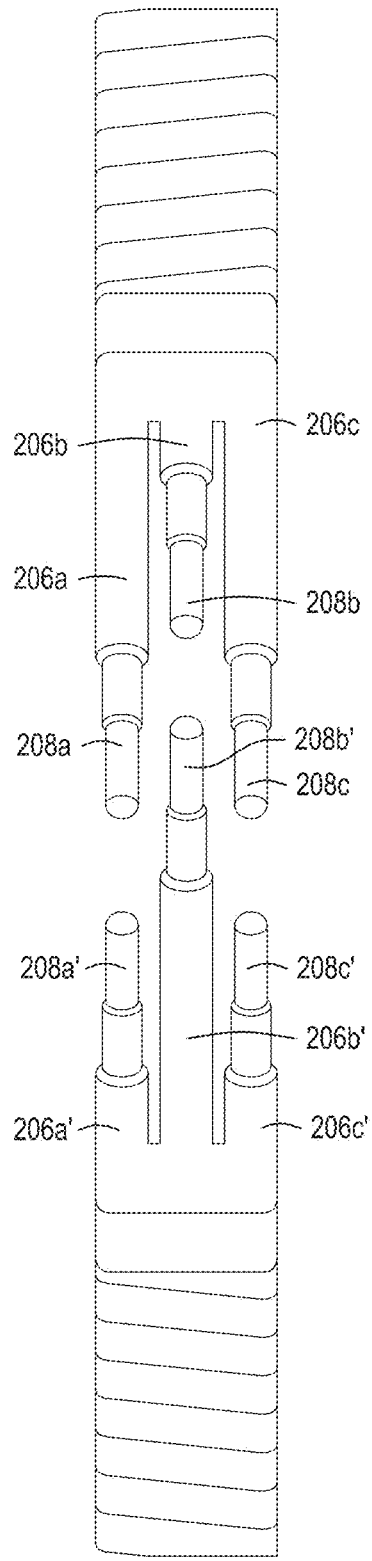
FIG. 3A illustrates a perspective view of electrical cable terminals configured for splicing.
Figure 3B:
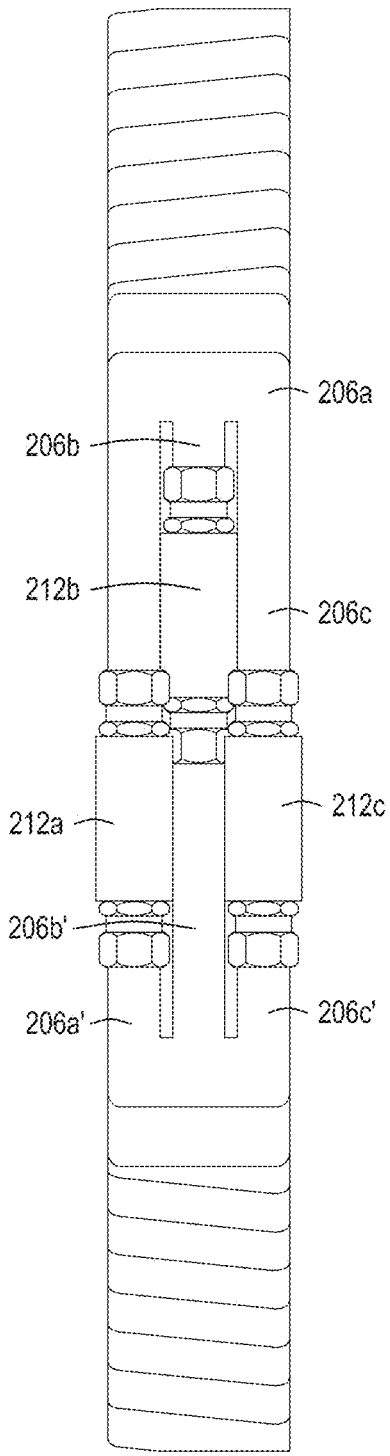
FIG. 3B illustrates a perspective view of cable splice sleeve assemblies removably coupled to spliced cables.

FIGS. 3A-B illustrate magnified perspective before-and-after views of portions of electrical cables that are spliced and sealably housed in respective cable splice sleeve assemblies 212.

FIG. 3A illustrates a perspective view of electrical cables 206a-c, 206a'-c' having respective cable terminals 208a-c, 208a'-c' configured for splicing. Portions of cable terminals 208a-c, 208a'-c' may be stripped of insulation, e.g., cover, cladding, or sheath. The cable terminals 208a-c may be respectively coupled to the cable terminals 208a'-c' via lugs 210 (see FIGS. 5-10). The electrical cables 206a-c, 206a'-c' may be disposed downhole.

FIG. 3B illustrates a perspective view of portions of electrical cables 206a-c, 206a'-c' of FIG. 3A that are removably coupled to respective cable splice sleeve assemblies 212a-c. The cable splice sleeve assemblies 212a-c may sealably house respective spliced cable terminals 208a-c, 208a'-c' (FIG. 3A) of the respective electrical cables 206a-c, 206a'-c'.

Figure 4:
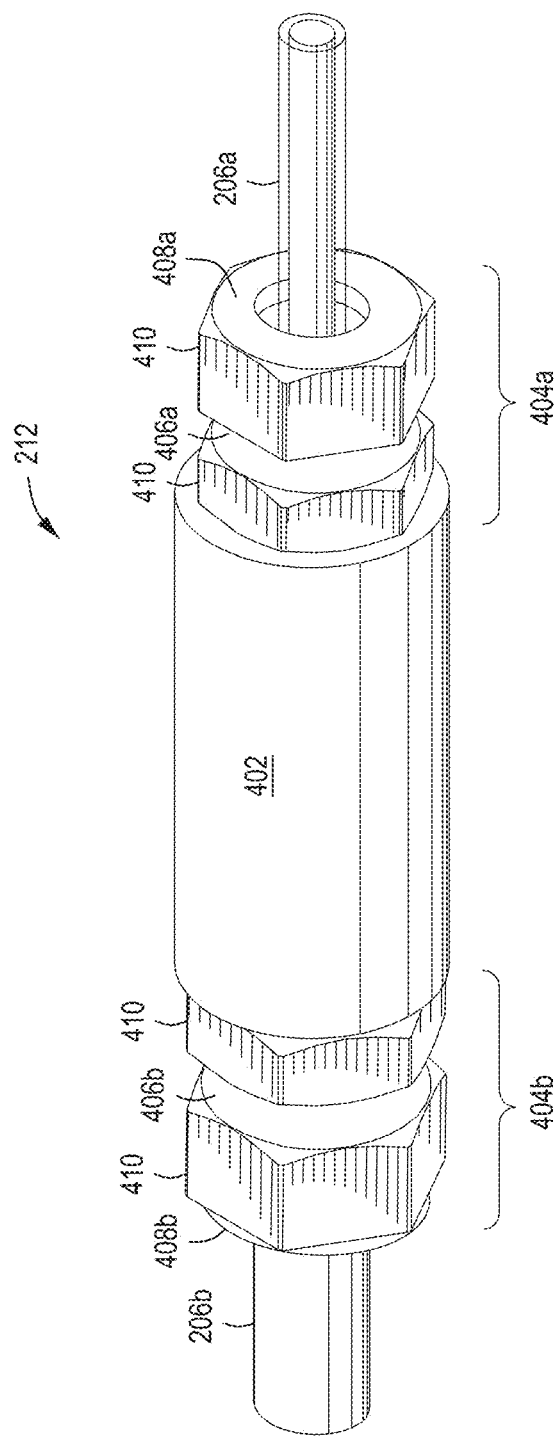
FIG. 4 illustrates a perspective view of a cable splice sleeve assembly removably coupled to two cables.

FIG. 4 illustrates a perspective view of a cable splice sleeve assembly 212 (any one of assemblies 212a-c of FIG. 3) removably coupled to electrical cables 206a, 206b. The cable splice sleeve assembly 212 may include a sleeve 402 and cable gland assemblies 404a, 404b. The electrical cable 206a may extend through the cable gland assembly 404a and the first end of the sleeve 402. The electrical cable 206b may extend through the cable gland assembly 404b and a second end of the sleeve 402.

Each cable gland assembly 404a, 404b may include a gland body 406a, 406b, a cap 408a, 408b, and a seal (not shown). Each gland body 406a, 406b may have socket surfaces 410a', 410b'. The socket surfaces 410a', 410b' may form a portion of an outer surface of the gland body 406. A portion of each gland body 406 may have pin threads (not shown) for coupling to box threads (not shown) of the sleeve 402.

In operation, a technician may couple a wrench to the socket surfaces 410 of the gland body 406, hold the sleeve 402 in place with a second wrench, and turn the first wrench relative to the sleeve 402 to couple or uncouple each gland body 406 and the sleeve 402. Thus, each gland body 406 may be threadably coupled to one end of the sleeve 402.

In some versions, the sleeve 402 may have socket surfaces (not shown). The socket surfaces may form a portion of an outer surface of the sleeve 402. The technician may couple a first wrench to the socket surfaces 410 of the gland body 406, hold the second socket surfaces of the sleeve 402, e.g., with a second wrench, by hand, or by clamp, and turn the first wrench relative to the sleeve 402 to couple or uncouple each gland body 406 and the sleeve 402.

Still referring to FIG. 4, each cap 408 may be coupled to an end of one gland body 406. Moreover, each cap 408 may have socket surfaces 410. The socket surfaces 410 may form a portion of an outer surface of each cap 408.

In operation, the technician may couple a first wrench to socket surfaces 410 of the cap 408, hold the gland body 406 in place with a second wrench, and turn the first wrench to cause the cap 408 to rotate relative to the gland body 406 to couple or uncouple each cap 408 and the gland body 406.

Figure 5:
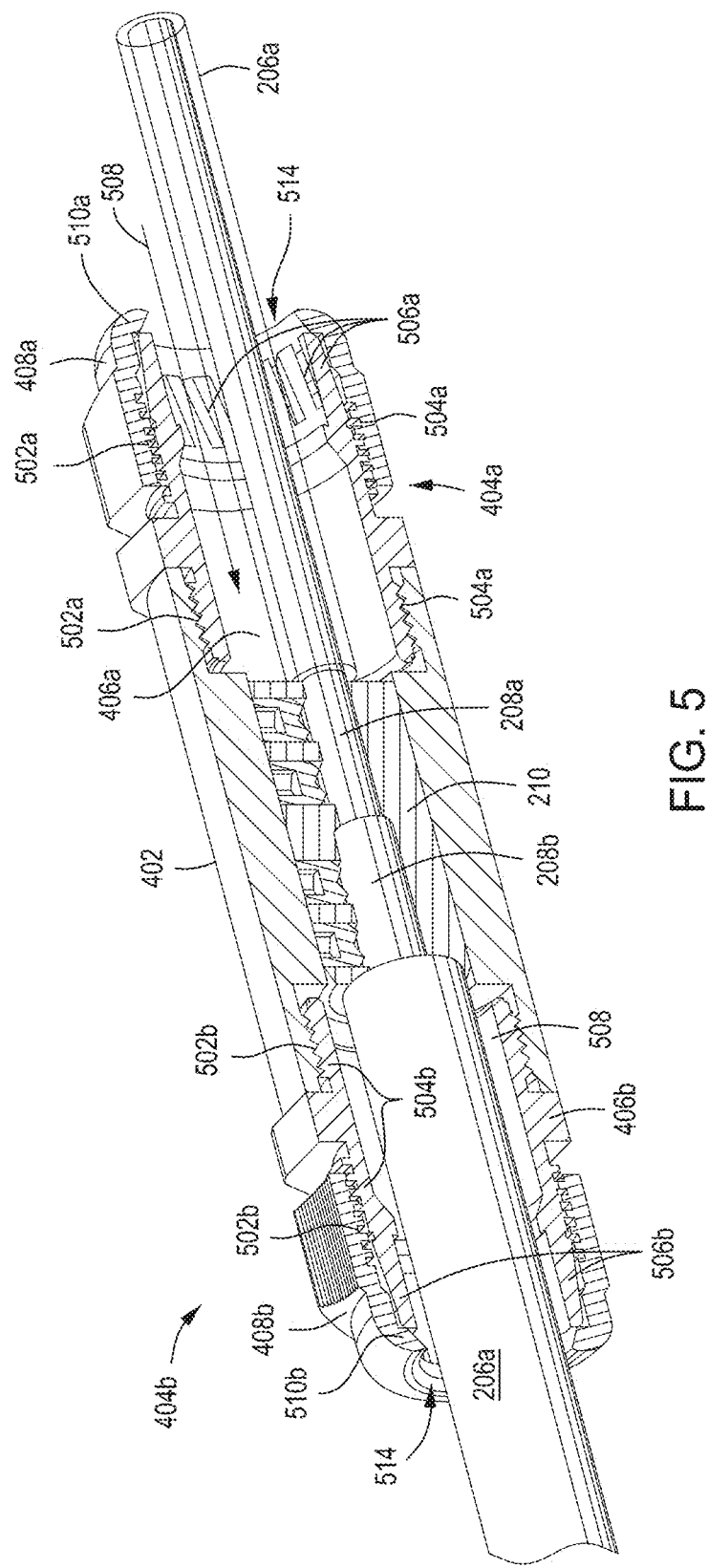
FIG. 5 illustrates a perspective, cross-sectional view of a cable splice sleeve assembly removably coupled to two spliced cables.

Referring to FIG. 5 and FIG. 6, a sleeve 402 may be threadably coupled to gland bodies 406a, 406b of the cable gland assemblies 404a, 404b, respectively. The sleeve 402 may have box threads 502a, 502b disposed on inner surfaces of the sleeve 402. Additionally, the box threads 502a may be disposed at a first end of the sleeve 402 and the box threads 502b may be disposed at a second end of the sleeve 402. Each gland body 406 may have pin threads 504 disposed on an outer surface of the gland body 406. The pin threads 504a, 504b may be threadably coupled to box threads 502a, 502b of the sleeve 402. Thus, the sleeve 402 and each cable gland assembly 404 may be threadably coupled.

Still referring to FIG. 5 and FIG. 6, the gland bodies 406a, 406b of the cable gland assemblies 404a, 404b may each be threadably coupled to a cap 408. Each gland body 406 may have pin threads 504 disposed on an outer surface of the gland body 406. Each cap 408 may have box threads 502 disposed on an inner surface of the cap 408. The pin threads 504 of the cap 408 may be threadably coupled the box threads 502 of the gland body 406.

Additionally, the gland bodies 406a, 406b of the cable gland assemblies 404a, 404b may each include fingers 506. The fingers 506 may extend axially from an end of each gland body 406. Also, the fingers 506 may be disposed circumferentially as part of the gland body 406. An aperture 508 is provided through which an electrical cable 206 may be disposed. Furthermore, a seal 512 may be disposed in the aperture 508 and may be abutted against the fingers 506.

When a gland body 406 and a cap 408 are threadably coupled, the fingers 506 of the gland body 406 may be abutted against a lip 510 of an inner surface of the cap 408. The lip 510 may define an aperture 514 through which the electrical cable 206 may extend. As shown in FIG. 5 and FIG. 6, lip 510 may have a first diameter that is larger at a first end closer to the sleeve 402 and a second diameter that is smaller at a second end farther from the sleeve 402.

To couple two electrical cables 206a, 206b, a technician may strip insulation portions from respective terminals 208a, 208b, e.g., cover, clad, or sheath. Next, the technician may feed the terminal 208a through the cap 408a, seal 512a, gland body 406a, and sleeve 402. Additionally, the technician may feed the terminal 208b through the cap 408b, seal 512b, and gland body 406b. Afterwards, the technician may removably couple the terminals 208a, 208b to a lug 210. The technician may then dispose the lug 210 in an aperture 602 of the sleeve 402. In addition, the technician may threadably couple the sleeve 402 to each gland body 406.

The technician may also threadably couple the gland body 406a to the cap 408a by turning the cap 408a in a first direction, e.g., left-handed turn, relative to the gland body 406a to mesh the respective threads 504a, 502a of the gland body 406a and the cap 408a. As the technician turns the cap 408a relative to the gland body 406a, the fingers 506a may be slid against the lip 510a. Between each point of contact of the finger 506a and lip 510a, the diameter of the lip 510a may change, e.g., become smaller, as the fingers 506a are slid towards the lip 510a. As the fingers are slid towards and against the lip 510a, the fingers 506a become more biased against the seal 512a. The biased fingers 506a may cause the seal 512a to be deformed and sealed against the electrical cable 206a.

The technician may threadably couple the gland body 406b to the cap 408b by following the same steps to threadably couple the gland body 406a and cap 408a as described above.

In some cases, to uncouple or service, e.g., test, repair, or replace, the spliced electrical cables 206a, 206b, the technician may uncouple various components, e.g., sleeve, gland body, and cap. First, the technician may turn the cap 408a in a second direction, e.g., right-handed turn, relative to the gland body 406a to threadably uncouple from the gland body 406a from the cap 408a. As the technician turns the cap 408a in the second direction relative to the gland body 406a, the fingers 506 may be slid away from the lip 510. Between each point of contact of the finger 506 and lip 510a, the diameter of the lip 510a may change, e.g., become larger, as the fingers 506 are slid away from the lip 510. As the fingers are slid away from the lip 510, the fingers 506 become less biased against the seal 512a. The less biased fingers 506 may cause the seal 512 return to its original form and be unsealed from the electrical cable 206a.

Second, the technician may turn the gland body 406a in a second direction, e.g., right-handed turn, relative to the sleeve 402 to threadably uncouple the gland body 406a from the sleeve 402.

Third, the technician may threadably uncouple the gland body 406b from the cap 408b by following the same steps to threadably uncouple the gland body 406a and the cap 408a as described above. Also, the technician may threadably uncouple the sleeve 402b from the gland body 406b by following the same steps to threadably uncouple the sleeve 402a from the gland body 406a as described above.

Afterwards, the technician may uncouple the lug 210 from of the aperture 602 of the sleeve 402.

FIG. 7 illustrates a cable splice sleeve assembly 212 that may include a first sleeve 402a and second sleeve 402b in which each sleeve 402 has fingers 506. The first sleeve 402a may include pin threads 504a, 504b. The pin threads 504a may be disposed on an outer surface of the first sleeve 402a. Also, the pin threads 504a may be disposed at a first end of the first sleeve 402a. The pin threads 504b may be disposed on an outer surface of the first sleeve 402a. Moreover, the pin threads 504a may be disposed at a second end of the first sleeve 402a. The pin threads 504a may be threadably coupled to box threads 502a disposed on an inner surface of a cap 408a.

Also, the first sleeve 402a may have fingers 506a. The fingers 506a may extend from an end of the first sleeve 402a. Additionally, the fingers 506a may be disposed adjacent to the pin threads 504a. A seal 512a may be disposed between the fingers 506a.

When the first sleeve 402a and the cap 408a are coupled, the fingers 506a may be abutted against a lip 510a of an inner surface of the cap 408a. The lip 510a may define an aperture 514a through which the electrical cable 206a may extend. As shown in FIG. 7, the lip 510a may have a first diameter that is larger at a first end closer to the second sleeve 402a and a second diameter that is smaller at a second end farther from the first sleeve 402a.

Additionally, the second sleeve 402b may include box threads 502b and pin threads 504a. The box threads 502b may be coupled to the thread 504b of the first sleeve 402a. Also, the box threads 502b may be disposed on an inner surface of the second sleeve 402b. In addition, the box threads 502b may be disposed at a first end of the second sleeve 402b. The pin threads 504a may be disposed on an outer surface of the second sleeve 402b. Moreover, the pin threads 504a may be disposed at a second end of the second sleeve 402b. The pin threads 504 may be threadably coupled to box threads 502b disposed on an inner surface of a cap 506b.

Furthermore, the second sleeve 402b may have fingers 506b. The fingers 506b may extend from an end of the second sleeve 402b. Additionally, the fingers 506b may be disposed adjacent to the pin threads 504a. A seal 512b may be disposed between the fingers 506b.

When the second sleeve 402b and the cap 408b are coupled, the fingers 506b may be abutted against a lip 510b of an inner surface of the cap 408b. The lip 510b may define an aperture 514b through which the electrical cable 206b may extend. As shown in FIG. 7, lip 510b may have a first diameter that is larger at a first end closer to the second sleeve 402b and a second diameter that is smaller at a second end farther from the second sleeve 402b.

To couple two electrical cables 206a, 206b, a technician may strip insulation, e.g., cover, clad, or sheath, portions from respective terminals 208a, 208b. Next, the technician may extend the terminal 208a through the cap 408a, seal 512a, and first sleeve 402a. Additionally, the technician may extend the terminal 208b through the cap 408b, seal 512b, and second sleeve 402b. Afterwards, the technician may removably couple the terminals 208a, 208b to a lug 210. The technician may then dispose the terminals 208a, 208b and the lug 210 in respective apertures 602a, 602b of the sleeves 402a, 402b. In addition, the technician may threadably couple the first sleeve 402a to the second sleeve 406b.

The technician may threadably couple the first sleeve 402a to the cap 408a by turning the cap 408a in a first direction, e.g., left-handed turn, relative to the first sleeve 402a and meshing the threads of the first sleeve 402a and the cap 408a. As the technician turns the cap 408a relative to the first sleeve 402a, the fingers 506a may be slid against the lip 510a. Between each point of contact of the finger 506a and lip 510a, the diameter of the lip 510a may change, e.g., become smaller, as the fingers 506a are slid towards the lip 510a. As the fingers are slid towards and against the lip 510a, the fingers 506a become more biased against the seal 512a. The biased fingers 506a may cause the seal 512a to be deformed and sealed against the electrical cable 206a.

Additionally, the technician may threadably couple the second sleeve 402b to the cap 408b by turning the cap 408b relative to the second sleeve 402b and meshing the threads of the second sleeve 402b and the cap 408b. As the technician turns the cap 408b in a second direction, e.g., left-handed turn, relative to the second sleeve 402b, the fingers 506b may be slid against the lip 510b. Between each point of contact of the finger 506b and lip 510b, the diameter of the lip 510b may change, e.g., become smaller, as the fingers 506b are slid towards the lip 510b. As the fingers are slid towards and against the lip 510b, the fingers 506b may become more biased against the seal 512b. The biased fingers 506b may cause the seal 512b to be deformed and sealed against the electrical cable 206b.

In some cases, to uncouple or service, e.g., test, repair, or replace, the spliced electrical cables 206a, 206b, the technician may uncouple various components, e.g., sleeves, seals, and caps. First, the technician may turn the cap 408a in a second direction, e.g., right-handed turn, relative to the first sleeve 402a to threadably uncouple from the first sleeve 402a from the cap 408a. As the technician turns the cap 408a relative to the first sleeve 402a in the second direction, the fingers 506 may be slid away from the lip 510a. Between each point of contact of the finger 506a and lip 510a, the diameter of the lip 510a may change, e.g., become larger, as the fingers 506a are slid away from the lip 510a. As the fingers are slid away from the lip 510a, the fingers 506a become less biased against the seal 512a. The seal 512a may be returned to its original form and be unsealed from the electrical cable 206a as the fingers 506a become less biased.

Second, the technician may threadably uncouple the second sleeve 402b from the cap 408b by following the steps corresponding to threadably uncoupling the first sleeve 402a and cap 408a, as described above.

Third, the technician may threadably uncouple the first sleeve 402a from the second sleeve 402b. The technician may hold the second sleeve 402b, e.g., via wrench, hand, or clamp, and turn the first sleeve 402b to uncouple the sleeves 402a, 402b.

In some versions, the sleeves 402a, 402b may each include socket surfaces (not shown). The socket surfaces may form a portion of an outer surface of the sleeves 402a, 402b. disposed on an outer surface of each sleeve 402. The technician may couple a first wrench to the socket surfaces of the first sleeve 402a, hold, e.g., via wrench, hand, or clamp, the second socket surfaces of the second sleeve 402b and turn the first wrench relative to the second sleeve 402b to couple or uncouple the sleeves 402a, 402b.

After uncoupling the sleeves 402a, 402b, the technician may uncouple the lug 210 from of the apertures 602a, 602b of the sleeves 402a, 402b for service.

FIG. 8 illustrates a cable splice sleeve assembly that may include a sleeve 402 having a first end removably coupled to a cap 408a and a second end removably coupled to a cable gland assembly 404. The first end of the sleeve 402 may include fingers 506a capable of being biased against the cap 408a. The fingers 506a may be spaced radially on the gland body 406 to define an aperture 508a through which an electrical cable 206a may extend. A seal 512a may be disposed between the fingers 506a. Additionally, pin threads 504a may be disposed on an outer surface of the sleeve 402. The pin threads 504a may be disposed adjacent to the fingers 506a. Also, the pin threads 504 may be threadably coupled to box threads 502 disposed on an inner surface of the cap 506a.

When the sleeve 402 and the cap 408a are coupled, the fingers 506a may be abutted against a lip 510a of an inner surface of the cap 408a. The lip 510a may define an aperture 514a through which the electrical cable 206a may extend. As shown in FIG. 8, the lip 510a may have a first diameter that is larger at a first end closer to the sleeve 402 and a second diameter that is smaller at a second end farther from the sleeve 402.

In addition, the sleeve 402 may have a second end having box threads 502. The box threads 502 may be coupled to pin threads 504 of a gland cable assembly 404. The cable gland assembly 404 may include a gland body 406, a seal 512b, and a cap 408b. The gland body 406, may be threadably coupled to the cap 408. The gland body 406 may have pin threads 504 disposed on an outer surface of the gland body 406. The cap 408 may have box threads 502 disposed on an inner surface of the cap 408. The pin threads 504 of the cap 408 may be threadably coupled the box threads 502 of the gland body 406.

Also, the gland body 406 may have fingers 506b extending axially from an end of the gland body 406 that is capable of being received in a cap 408b. The fingers 506b may be spaced radially on the gland body 406 to define an aperture 508b through which an electrical cable 206b may extend. Also, the seal 512b may be disposed in the aperture 508b and may be abutted against the fingers 506b.

When the gland body 406 and the cap 408b are coupled, the fingers 506b may be abutted against a lip 510b of an inner surface of the cap 408b. The lip 510b may define an aperture 514b through which the electrical cable 206 may extend. As shown in FIG. 8, the lip 510b may have a first diameter that is larger at a first end closer to the sleeve 402 and a second diameter that smaller at a second end farther from the sleeve 402.

To couple two electrical cables 206a, 206b, a technician may strip insulation, e.g., cover, clad, or sheath, portions from respective terminals 208a, 208b. Next, the technician may extend the terminal 208a through the cap 408a, seal 512a, and the sleeve 402. Also, the technician may extend the terminal 208b through the cap 408b, seal 512b, and gland body 406. Afterwards, the technician may removably couple the terminals 208a, 208b to a lug 210. The technician may then dispose and the lug 210 in an aperture 602 of the sleeve 402. In addition, the technician may threadably couple the sleeve 402 to the gland body 406.

The technician may also threadably couple the sleeve 402 to the cap 408a by turning the cap 408a in a first direction, e.g., left-handed turn, relative to the sleeve 402 and meshing the respective threads 504a, 502 of the sleeve 402 and the cap 408a. As the technician turns the cap 408a relative to the sleeve 402, the fingers 506a may be slid against the lip 510a. Between each point of contact of the finger 506a and lip 510a, the diameter of the lip 510a may change, e.g., become smaller, as the fingers 506a are slid towards the lip 510a. As the fingers are slid towards and/or against the lip 510a, the fingers 506a may become more biased against the seal 512a.

The biased fingers 506a may cause the seal 512a to be deformed and sealed against the electrical cable 206a.

The technician may also threadably couple the cable gland assembly 404 to the sleeve 402. The technician may turn the gland body 406 of the cable gland assembly 404 in a first direction, e.g., left-handed turn, relative to the sleeve 402 to mesh the threads of the gland body 406 and sleeve 402. Also, the technician may turn the cap 408b in a first direction, e.g., left-handed turn, relative to the gland body 406 to mesh the threads of the gland body 406 and the cap 408b. As the technician turns the cap 408b relative to the gland body 406, the fingers 506b may be slid against the lip 510b. Between each point of contact of the finger 506b and lip 510b, the diameter of the lip 510b may taper, e.g., become smaller, as the fingers 506b are slid towards the lip 510b. As the fingers are slid towards and/or against the lip 510b, the fingers 506b may become more biased against the seal 512b. The biased fingers 506b may cause the seal 512b to be deformed and sealed against the electrical cable 206b.

In some cases, to uncouple or service, e.g., test, repair, or replace, the spliced electrical cables 206a, 206b, the technician may uncouple various components, e.g., sleeves, gland body, and caps. First, the technician may turn the cap 408a in a second direction, e.g., right-handed turn, relative to the sleeve 402 to threadably uncouple from the sleeve 402 from the cap 408a. As the technician turns the cap 408a relative to the sleeve 402 in the second direction, the fingers 506a may be slid away from the lip 510a. Between each point of contact of the finger 506a and lip 510a, the diameter of the lip 510a may change, e.g., become larger, as the fingers 506 are slid away from the lip 510a. As the fingers are slid away from the lip 510a, the fingers 506a become less biased against the seal 512a. The seal 512a may be returned to its original form and be unsealed from the electrical cable 206a as the fingers 506a become less biased.

Second, the technician may threadably uncouple the sleeve 402 from the electrical cable 408b by following the same steps to threadably uncouple the second sleeve 402a and cap 408a as described above.

Third, the technician may threadably uncouple the first sleeve 402a from the second sleeve 402b.

Afterwards, the technician may uncouple the lug 210 from of the apertures 602a, 602b of the sleeve 402a, 402b.

In some versions, each sleeve 402 may also include socket surfaces (not shown). The socket surfaces may form a portion of an outer surface of each sleeve 402. Thus, a technician may couple a first wrench to the socket surfaces of the sleeve 402a, hold, e.g., via wrench, hand, or clamp, the second socket surfaces of the sleeve 402b and turn the first wrench relative to the sleeve 402b to couple or uncouple the sleeves 402a, 402b.

Figure 9:
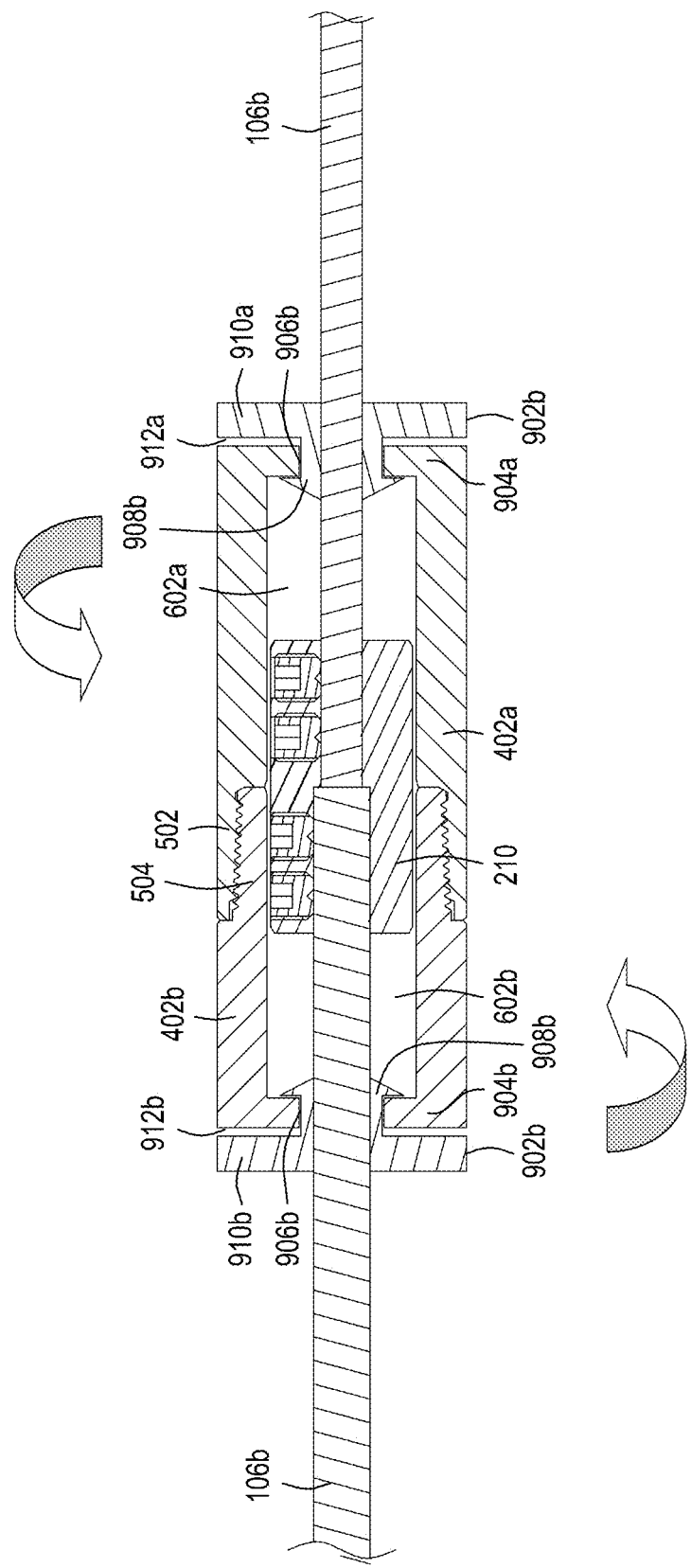
FIG. 9 illustrates a cable splice sleeve assembly including seals having frusto-conical ends.

FIG. 9 illustrates a cable splice sleeve assembly 212 that may include seals 902a, 902b having frusto-conical ends 908a, 908b extending through a first sleeve 402a and a second sleeve 402b, respectively. The first sleeve 402a may have a lip 904a. The lip 904a may have an inner surface that defines an aperture 906a. The second sleeve 402b may have lip 904b. The lip 904b may have an inner surface that defines an aperture 906b.

Further, each seal 902a, 902b may have a corresponding cylindrical end 910a, 910b. Moreover, a circumferential groove 912a may be dispose between the frusto-conical end 908a and the cylindrical end 910a of the seal 902a. Also, a circumferential groove 912a may be dispose between the frusto-conical end 908a and the cylindrical end 910a of the seal 902a.

A seal 902 may be constructed from an elastomer, e.g., plastic, latex, rubber, nitrile rubber, butyl rubber, silicone, neoprene, and/or polyvinyl chloride. Therefore, a frusto-conical end 908 of a seal 902 may extend through an aperture 906 until a cylindrical end 910 of a seal 902 is abutted against a lip 902 of a sleeve 402. Thus, once the frusto-conical end 908 of the seal 902 is fully extended through a lip 904, the lip 904 would be disposed within a groove 912 of the seal 902. Also, the frusto-conical end 908 may be abutted against an inner wall of the lip 904. In other words, the lip 904 would be retained between the frusto-conical end 908 and the cylindrical end of the seal 902.

An electrical cable 106 may extend through the seal 902 and the lip 904. Accordingly, the seal 902a, 902b may extend through the apertures 906a, 906b of sleeves 402a, 402b, respectively.

Additionally, the first sleeve 402a may include box threads 502. The box threads 502 may be coupled to the pin thread 504 of the second sleeve 402b. Also, the box threads 502 may be disposed on an inner surface of the first sleeve 402a. In addition, the box threads 502 may be disposed at a second end of the first sleeve 402b. The pin threads 504 may be disposed on an outer surface of the second sleeve 402b. Moreover, the pin threads 504 may be disposed at a first end of the second sleeve 402b. The pin threads 504 of the sleeve 402b may be threadably coupled to box threads 504 of the sleeve 402a.

To couple two electrical cables 206a, 206b, a technician may strip insulation, e.g., cover, clad, or sheath, portions from respective terminals 208a, 208b. Next, the technician may extend the terminal 208a through the seal 902a and the lip 904a of the first sleeve 402a. Additionally, the technician may extend the terminal 208b through the seal 902a and the lip 904a of the second sleeve 402b. Afterwards, the technician may removably couple the terminals 208a, 208b to a lug 210. The technician may then dispose the terminals 208a, 208b and the lug 210 in respective apertures 602a, 602b of the sleeves 402a, 402b. In addition, the technician may threadably couple the first sleeve 402a to the second sleeve 406b.

In some cases, to uncouple or service, e.g., test, repair, or replace, the spliced electrical cables 206a, 206b, the technician may uncouple the sleeves 402a, 402b. The technician may threadably uncouple the first sleeve 402a from the second sleeve 402b. The technician may hold the second sleeve 402b, e.g., via wrench, hand, or clamp, and turn the first sleeve 402b to uncouple the sleeves 402a, 402b.

After uncoupling the sleeves 402a, 402b, the technician may uncouple the lug 210 from of the apertures 602a, 602b of the sleeves 402a, 402b for service.

Figure 10:
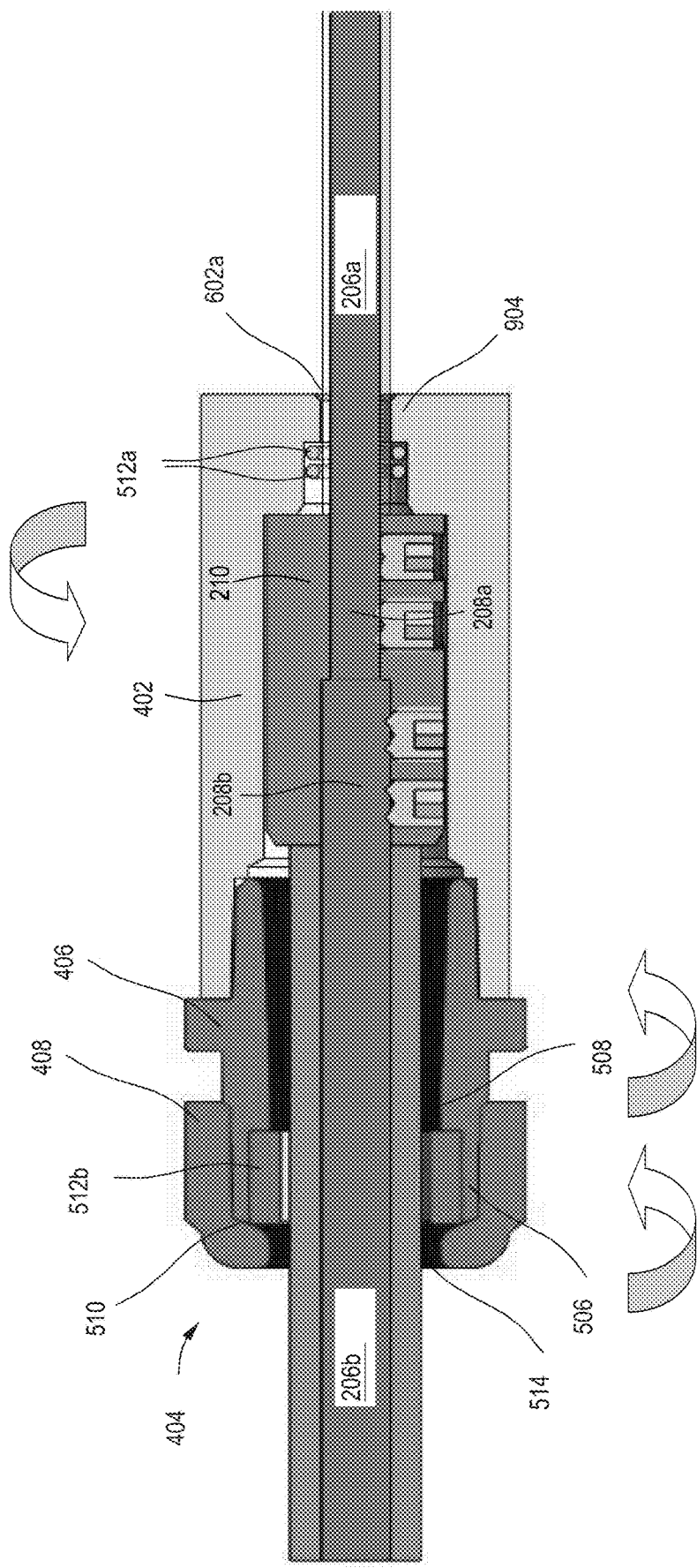
FIG. 10 illustrates a cable splice sleeve assembly that having a seal disposed in a sleeve.

FIG. 10 illustrates a cable splice sleeve assembly that may include a seal 512a disposed in a sleeve 402. The sleeve 402 having a first end and a second end. The first end of the sleeve 402 may have a lip 904. The lip may have an aperture 602a. The seal 512a may be disposed adjacent to the lip 904. The seal 512a may be abutted against the lip 904. Furthermore, the seal 512a may be disposed adjacent to the aperture 602a of the lip 904. Alternatively, the seal 512a may be disposed within the aperture 602a. The seal 512a and the lip 904 may be coaxial, e.g., share a central axis.

A terminal of a cable 106a may extend through the seal 512a and the aperture 602a of the lip 904. The diameter of the cable 106a may be larger than the inner diameter of the seal 512a. Therefore, the cable 106a may be slidably abutted against the seal 512a.

The second end of the sleeve 402 may be removably coupled to a cable gland assembly 404. The second end of the sleeve 402 may have box threads 502 (see FIGS. 5-8). The box threads 502 may be coupled to pin threads 504 (see FIGS. 5-8) of a gland cable assembly 404. The cable gland assembly 404 may include a gland body 406, a seal 512b, and a cap 408. The gland body 406, may be threadably coupled to the cap 408. The gland body 406 may have pin threads 504 (see FIGS. 5-8) disposed on an outer surface of the gland body 406. The cap 408 may have box threads 502 (see FIGS. 5-8) disposed on an inner surface of the cap 408. The pin threads 504 of the cap 408 may be threadably coupled the box threads 502 of the gland body 406.

Also, the gland body 406 may have fingers 506 extending axially from an end of the gland body 406 that is capable of being received in a cap 408. The fingers 506 may be spaced radially on the gland body 406 to define an aperture 508 through which an electrical cable 206b may extend. Also, the seal 512b may be disposed in the aperture 508 and may be abutted against the fingers 506b.

When the gland body 406 and the cap 408 are coupled, the fingers 506 may be abutted against a lip 510 of an inner surface of the cap 408. The lip 510 may define an aperture 514 through which the electrical cable 206 may extend. As shown in FIG. 10, the lip 510b may have a first diameter that is larger at a first end closer to the sleeve 402 and a second diameter that smaller at a second end farther from the sleeve 402.

To couple two electrical cables 206a, 206b, a technician may strip insulation, e.g., cover, clad, or sheath, portions from respective terminals 208a, 208b. Next, the technician may extend the terminal 208a through the lip 904, seal 512a, and the sleeve 402. Also, the technician may extend the terminal 208b through the cap 408, seal 512b, and gland body 406. Afterwards, the technician may removably couple the terminals 208a, 208b to a lug 210. The technician may then dispose and the lug 210 in an aperture of the sleeve 402. In addition, the technician may threadably couple the sleeve 402 to the gland body 406.

The technician may also threadably couple the sleeve 402 to the cap 408 by turning the cap 408 in a first direction, e.g., left-handed turn, relative to the sleeve 402 and meshing the respective threads 504, 502 of the sleeve 402 and the cap 408. As the technician turns the cap 408 relative to the sleeve 402, the fingers 506 may be slid against the lip 510. Between each point of contact of the finger 506 and lip 510, the diameter of the lip 510 may change, e.g., become smaller, as the fingers 506 are slid towards the lip 510. As the fingers are slid towards and/or against the lip 510, the fingers 506 may become more biased against the seal 512b. The biased fingers 506 may cause the seal 512b to be deformed and sealed against the electrical cable 206b.

In some cases, to uncouple or service, e.g., test, repair, or replace, the spliced electrical cables 206a, 206b, the technician may uncouple various components, e.g., sleeves, gland body, and caps. First, the technician may turn the cap 408 in a second direction, e.g., right-handed turn, relative to the sleeve 402 to threadably uncouple from the sleeve 402 from the cap 408. As the technician turns the cap 408 relative to the sleeve 402 in the second direction, the fingers 506 may be slid away from the lip 510. Between each point of contact of the fingers 506 and lip 510, the diameter of the lip 510 may change, e.g., become larger, as the fingers 506 are slid away from the lip 510. As the fingers are slid away from the lip 510, the fingers 506 become less biased against the seal 512b. The seal 512b may be returned to its original form and be unsealed from the electrical cable 206b as the fingers 506 become less biased.

Afterwards, the technician may uncouple the lug 210 from of the apertures of the sleeve 402.

It is contemplated that various versions of cable splice sleeve assemblies discussed above may have a sleeve that has different components coupled to the ends of the sleeve. For example, a sleeve may have a first end removably coupled a cable gland assembly and a second end removably coupled to a cap. In another version, a sleeve may have a first end removably coupled a cable gland assembly and a seal having a frusto-conical end extending through a second end of the sleeve. In other versions, a sleeve may have a first end removably coupled a cable gland assembly and a seal disposed on or abutted against a lip of a second end of the sleeve.

What is claimed as the invention is:

1. A cable splice sleeve assembly, comprising:
   a sleeve for a lug to be disposed therein, the sleeve having:
      a first sleeve end for a portion of a first electrical cable terminal to be disposed therein; and
      a second sleeve end for a portion of a second electrical cable terminal to be disposed therein;
   a first gland body directly engaged to the first sleeve end;
   a first seal disposed in the first gland body for sealable coupling to the first electrical cable terminal;
   a first cap pressing a portion of the first gland body against the first seal;
   a second gland body directly engaged to the second sleeve end;
   a second seal disposed in the second gland body for sealable coupling to the second electrical cable terminal; and
   a second cap pressing a portion of the second gland body against the second seal.

2. The cable splice sleeve assembly of claim 1, wherein the sleeve, the first gland body, the first seal, the first cap, the second gland body, the second seal, and the second cap are capable of forming a sealed chamber around the first electrical cable terminal, the second electrical cable terminal, and the lug.

3. The cable splice sleeve assembly of claim 1, wherein the first gland body has an inner surface having a diameter less than a diameter of the lug.

4. The cable splice sleeve assembly of claim 1, wherein the second gland body has an inner surface having a diameter less than a diameter of the lug.

5. The cable splice sleeve assembly of claim 1, wherein the first cap has a lip abutted against first fingers of the first gland body.

6. The cable splice sleeve assembly of claim 1, wherein the second cap has a lip abutted against second fingers of the second gland body.

7. The cable splice sleeve assembly of claim 1, wherein the first sleeve end has box threads coupled to pin threads disposed on the first gland body.

8. The cable splice sleeve assembly of claim 1, wherein the second sleeve end has box threads coupled to pin threads disposed on the second gland body.

9. A cable splice sleeve assembly, comprising:
   a sleeve for a lug to be disposed therein, the sleeve comprising:
      a first sleeve end for a portion of a first electrical cable terminal to be disposed therein, the first sleeve end having sleeve fingers; and
      a second sleeve end for a portion of a second electrical cable terminal to be disposed therein;
   a first seal disposed between the sleeve fingers;

a first cap coupled to the first sleeve end and pressing a portion of the sleeve fingers against the first seal;
a gland body coupled to the second sleeve end;
a second seal disposed in the gland body; and
a second cap coupled to the gland body and pressing a portion of the gland body against the second seal.

10. The cable splice sleeve assembly of claim 9, wherein the first cap has a lip abutted against the sleeve fingers.

11. The cable splice sleeve assembly of claim 9, wherein the second cap has a lip abutted against fingers of the gland body.

12. A cable splice sleeve assembly, comprising:
a first sleeve for a lug to be disposed therein, comprising:
   a first sleeve end for a portion of a first electrical cable terminal to be disposed therein; and
   a second sleeve end;
a gland body coupled to the first sleeve end of the first sleeve;
a first seal disposed in the gland body;
a first cap coupled to the gland body and pressing a portion of the gland body against the first seal; and
a second sleeve, comprising:
   a first sleeve end coupled to the second sleeve end of the first sleeve; and
   a second sleeve end for a portion of a second electrical cable terminal to be disposed therein, the second sleeve end having sleeve fingers;
a second seal disposed between the sleeve fingers; and
a second cap coupled to the second sleeve end and pressing the sleeve fingers against the second seal.

13. A cable splice sleeve assembly, comprising:
a first sleeve for a lug to be disposed therein, the first sleeve comprising:
   a first sleeve end for a portion of a first electrical cable terminal to be disposed therein, the first sleeve end having first sleeve fingers; and
   a second sleeve end;
a first seal disposed between the first sleeve fingers;
a first cap coupled to the first sleeve end and pressing the first sleeve fingers against the first seal;
a second sleeve, the second sleeve comprising:
   a first sleeve end coupled to the second sleeve end of the first sleeve; and
   a second sleeve end for a portion of a second electrical cable terminal to be disposed therein, the second sleeve end having second sleeve fingers; and
a second seal disposed between the second sleeve fingers; and
a second cap coupled to the second sleeve end and pressing the second sleeve fingers against the second seal.

14. The cable splice sleeve assembly of claim 13, wherein the first cap has a lip abutted against the first sleeve fingers.

15. The cable splice sleeve assembly of claim 13, wherein the second cap has a lip abutted against the second sleeve fingers.

16. A cable splice sleeve assembly, comprising:
a first sleeve for a portion of a lug to be disposed therein, the first sleeve comprising:
   a first sleeve end having a first lip for a portion of a first electrical cable terminal to extend therethrough; and
   a second sleeve end for a portion of the first electrical cable terminal to be disposed therein;
a first seal for the first electrical cable terminal to extend through, wherein the first seal has a first frusto-conical portion extended through the first lip;
a second sleeve for a portion of the lug to be disposed therein, the second sleeve comprising:
   a first sleeve end for a portion of a second electrical cable terminal to be disposed therein; and
   a second sleeve end having a second lip for a portion of the second electrical cable terminal to extend therethrough; and
a second seal for the second electrical cable terminal to extend through, wherein the second seal has a second frusto-conical portion extended through the second lip.

17. The cable splice sleeve assembly of claim 16, wherein the first frusto-conical portion of the first seal is abutted against an inner wall of the first lip.

18. The cable splice sleeve assembly of claim 16, wherein the second frusto-conical portion of the second seal is abutted against an inner wall of the second lip.

19. A cable splice sleeve assembly, comprising:
a sleeve for a lug to be disposed therein, the sleeve having:
   a first sleeve end for a portion of a first electrical cable terminal to be disposed therein; and
   a second sleeve end having a lip for a portion of a second electrical cable terminal to extend therethrough;
a first gland body directly engaged to the first sleeve end;
a first seal disposed in the first gland body for sealable coupling to the first electrical cable terminal;
a first cap pressing a portion of the first gland body against the first seal; and
a second seal disposed in the second sleeve end for sealable coupling between the second sleeve end and the second electrical cable terminal.

20. The cable splice sleeve assembly of claim 19, wherein the second seal is capable of being abutted against the lip.

* * * * *